(12) United States Patent
Bodin et al.

(10) Patent No.: US 7,509,212 B2
(45) Date of Patent: Mar. 24, 2009

(54) ENABLING SERVICES ON A UAV

(75) Inventors: William Kress Bodin, Austin, TX (US); Jesse Redman, Cedar Park, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 11/041,506

(22) Filed: Jan. 24, 2005

(65) Prior Publication Data

US 2006/0167597 A1  Jul. 27, 2006

(51) Int. Cl.
*G05D 1/10*  (2006.01)
*B64C 13/18*  (2006.01)

(52) U.S. Cl. .......................... 701/206; 701/11; 701/24; 244/190

(58) Field of Classification Search ................. 244/190, 244/195; 701/10, 11, 205, 206, 24
See application file for complete search history.

(56) References Cited

U.S. PATENT DOCUMENTS

| | | | |
|---|---|---|---|
| 5,240,207 A | 8/1993 | Eiband et al. | |
| 5,552,983 A | 9/1996 | Thornbert et al. | |
| 5,581,250 A | 12/1996 | Khvilivitzky | |
| 5,716,032 A | 2/1998 | McIngvale | |
| 5,889,990 A * | 3/1999 | Coleman et al. | 719/322 |
| 5,890,441 A | 4/1999 | Swinson et al. | |
| 6,056,237 A | 5/2000 | Woodland | |
| 6,130,705 A | 10/2000 | Lareau et al. | |
| 6,219,004 B1 | 4/2001 | Johnson | |
| 6,377,875 B1 | 4/2002 | Schwaerzler | |
| 6,430,599 B1 * | 8/2002 | Baker et al. | 709/203 |
| 6,498,968 B1 | 12/2002 | Bush | |
| 6,813,559 B1 * | 11/2004 | Bodin et al. | 701/206 |
| 6,856,894 B1 * | 2/2005 | Bodin et al. | 701/206 |
| 6,993,570 B1 * | 1/2006 | Irani | 709/218 |
| 7,107,148 B1 * | 9/2006 | Bodin et al. | 701/206 |

(Continued)

OTHER PUBLICATIONS

Johnson, et al; Improving Geolocation and Spatial Accuracies with the Modular Integrated Avionics Group; Inspec AN 5467118; pp. 88-97; Apr. 1996; SPIE-Int. Soc. Opt.; England.

(Continued)

*Primary Examiner*—Thomas G Black
*Assistant Examiner*—Lin B Olsen
(74) *Attorney, Agent, or Firm*—H. Artoush Ohanian; Justin Dillon; Biggers & Ohanian

(57) ABSTRACT

Methods, systems, and products are provided for enabling services on a UAV. Embodiments include determining a current position of the UAV, selecting a service module for the UAV in dependence upon the current position of the UAV, uploading the service module to the UAV, and executing the service module on the UAV. Selecting a service module for the UAV in dependence upon the current position of the UAV may include retrieving from a module database a module record in dependence upon the current position of the UAV. Typical embodiments also include selecting a flying pattern algorithm in dependence upon the selected service module and piloting the UAV in accordance with the flying pattern algorithm. Many embodiments also include selecting a navigational algorithm in dependence upon the selected service module and navigating the UAV in accordance with the navigational algorithm.

1 Claim, 23 Drawing Sheets

U.S. PATENT DOCUMENTS

| | | | | |
|---|---|---|---|---|
| 7,130,741 | B2* | 10/2006 | Bodin et al. | 701/206 |
| 7,231,294 | B2* | 6/2007 | Bodin et al. | 701/206 |
| 7,286,913 | B2* | 10/2007 | Bodin et al. | 701/11 |
| 2001/0035995 | A1 | 11/2001 | Ruggiero | |
| 2006/0058928 | A1* | 3/2006 | Beard et al. | 701/11 |
| 2006/0074557 | A1* | 4/2006 | Mulligan et al. | 701/213 |

OTHER PUBLICATIONS

Gunapala, et al.; QWIP Technology for Both Military and Civilian Applications; Inspec AN 7255522; Apr. 2001; pp. 498-505; SPIE-Int. Soc. Opt.; England.

Spenny, et al; Closely Supervised Control of a Target-Steered UAV; Inspec AN 6652724;Sep. 1999; pp. 179-190; SPIE-Int. Soc. Opt.; England.

RQ-1 Predator Unmanned Aerial Vehicle; May 2002; pp. 1-3; U.S. Air Force Fact Sheet; USA.

Gormley, et al; Controlling Unmanned Air Vehicles: New Challenges; Mar. 2003; pp. 1-21; Commissioned by the Non-Proliferation Education Center; USA.

Young; Unmanned Aerial Vehicles Web Site; pp. 1-2; NASA GSFC/Wallops Flight Facility, Wallops Island, VA; USA.

Unmanned Aircraft.com Website; http://www.unmannedaircraft.con/.

Stellman, et al.; War Horse; Apr. 2001; Inspec. AN 7295892; vol. 4379; pp. 339-346; SPIE-Int. Soc. Opt.; USA.

Dittrich, et al.; 21st Digital Avionics Systems Conference; Oct. 2002; Inspec. AN 7614545; vol. 2; IEEE; Piscataway, NJ; USA, P i to x plus 2 more.

Dittrich; Design and Integration of an Unmanned Aerial Vehicle Navigation System; Thesis; May 2002; pp. i-52; Georgia Institute of Technology; USA.

Figure 8: Data link module with removed side panel; pp. 18-37; USA.

Figure 17: Simulated GPS malfunction, on the ground, 15 sec; 38-52; USA.

Somers; Unmanned Aerial Vehicle—Demonstration of Autonomous Flight, 09-9822; 1999 IR&D Home; pp. 1-4; USA.

Brown, et al.; Airporne Reconnaissance XXIII; Jul. 1999; pp. 2-8; vol. 3751; SPIE-Int. Soc. Opt; England.

Nettleton, et al.; Multiple Platform Localization and Map Building; Nov. 2000; pp. 337-347; Inspec AN 6979413; SPEI-Int. Soc. Opt. Eng; US.

Schumacher et al.; Adaptive Control of UAVs in Close-coupled Formation Flight; 2000; pp. 849-853; Insp An 6770904; vol. 6 Danvers, MA; US.

Singh et al; Adaptive Feedback Linearizing Nonlinear Close Formation Control of UAVs; 2000; pp. 854-858; Inspec AN 6770905; vol. 2; Danvers, Ma; US.

Hallberg, et al.; Development of a Flight Test Systems for Unmanned Air Vehicles; Feb. 1999; pp. 55-65; IEEE vol. 19; Inspec AN 6176739; Monterey, CA; US.

Shiller, et al.; Mission Adaptable Autonomous Vehicles; 1991; pp. 143-150; Inspec AN 4208922; Newton, MA; US.

Sutcliffe, et al.; Decentralised Data Fusion Applied to a Network of Unmanned Aerial Vehicles; Inspec AN 7289965; Feb. 2002; pp. 71-76; Piscataway, NJ; USA.

* cited by examiner

ENABLING SERVICES ON A UAV

BACKGROUND OF THE INVENTION

1. Field of the Invention

The field of the invention is data processing, or, more specifically, methods, systems, and products for navigating a UAV having an on-board digital camera.

2. Description of Related Art

Many forms of UAV are available in prior art, both domestically and internationally. Their payload weight carrying capability, their accommodations (volume, environment), their mission profiles (altitude, range, duration), and their command, control and data acquisition capabilities vary significantly. Routine civil access to these various UAV assets is in an embryonic state.

Conventional UAVs are typically manually controlled by an operator who may view aspects of a UAV's flight using cameras installed on the UAV with images provided through downlink telemetry. Navigating such UAVs from a starting position to one or more waypoints requires an operator to have specific knowledge of the UAV's flight, including such aspects as starting location, the UAV's current location, waypoint locations, and so on. Operators of prior art UAVs usually are required generally to manually control the UAV from a starting position to a waypoint with little aid from automation. There is therefore an ongoing need for improvement in the area of UAV navigations.

SUMMARY OF THE INVENTION

Methods, systems, and products are provided for enabling services on a UAV. Embodiments include determining a current position of the UAV, selecting a service module for the UAV in dependence upon the current position of the UAV, uploading the service module to the UAV, and executing the service module on the UAV. Selecting a service module for the UAV in dependence upon the current position of the UAV may include retrieving from a module database a module record in dependence upon the current position of the UAV. Typical embodiments also include selecting a flying pattern algorithm in dependence upon the selected service module and piloting the UAV in accordance with the flying pattern algorithm. Many embodiments also include selecting a navigational algorithm in dependence upon the selected service module and navigating the UAV in accordance with the navigational algorithm.

Some embodiments also include dispatching the UAV to a waypoint. Dispatching the UAV to a waypoint may include receiving in a remote control device a user's selection of a GUI map pixel that represents a waypoint for UAV navigation, the pixel having a location on the GUI, mapping the pixel's location on the GUI to Earth coordinates of the waypoint, transmitting the coordinates of the waypoint to the UAV, reading a starting position from a GPS receiver on the UAV, and piloting the UAV, under control of a navigation computer, from the starting position to the waypoint in accordance with a navigation algorithm. Mapping the pixel's location on the GUI to Earth coordinates of the waypoint may include mapping pixel boundaries of the GUI map to Earth coordinates, identifying a range of latitude and a range of longitude represented by each pixel, and locating a region on the surface of the Earth in dependence upon the boundaries, the ranges, and the location of the pixel on the GUI map.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
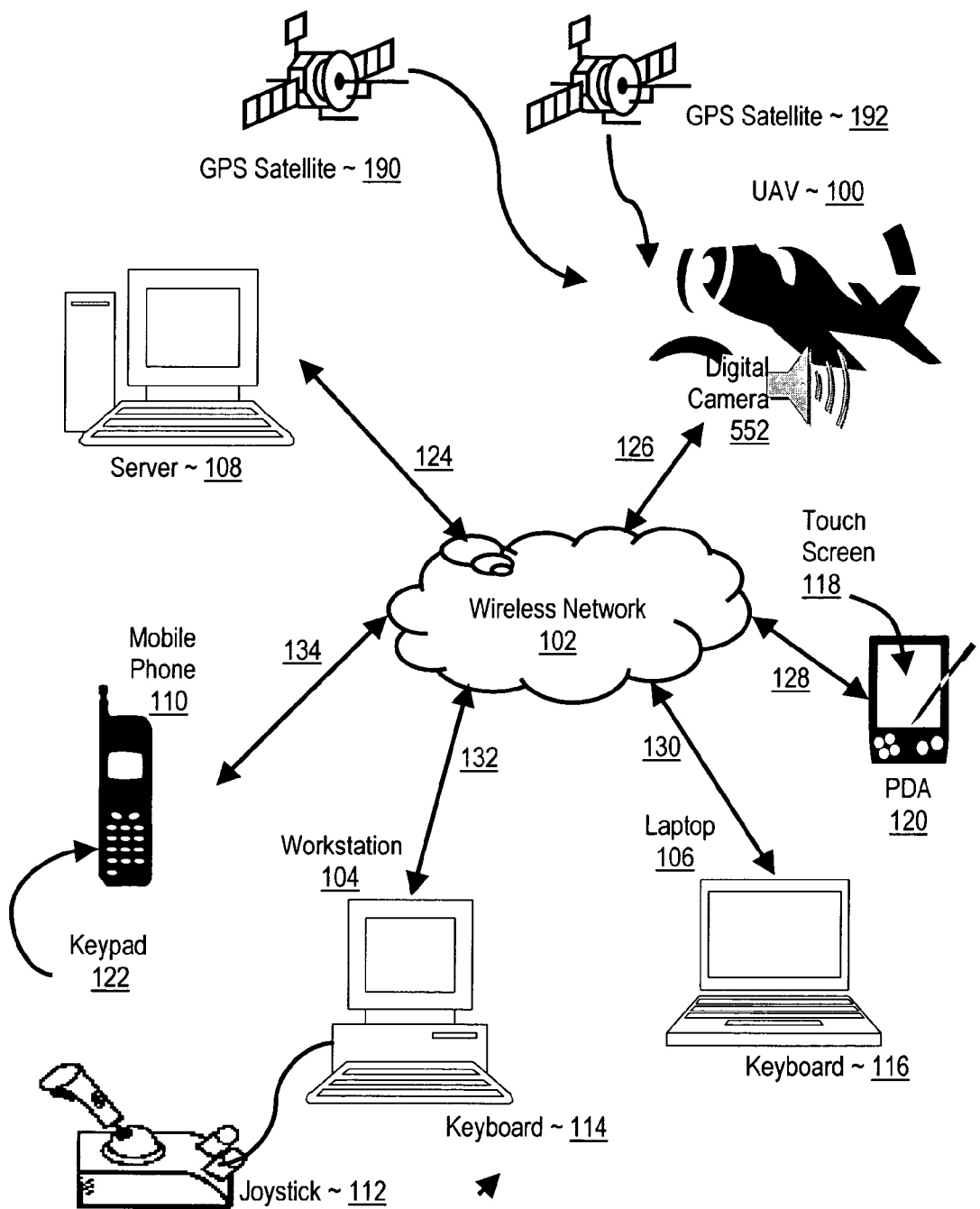
FIG. 1 sets forth a system diagram illustrating relations among components of an exemplary system for navigating a UAV.

The present invention is described to a large extent in this specification in terms of methods for navigating a UAV having an on-board digital camera. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"Airspeed" means UAV airspeed, the speed of the UAV through the air.

A "cross track" is a fixed course from a starting point directly to a waypoint. A cross track has a direction, a 'cross track direction,' that is the direction straight from a starting point to a waypoint. That is, a cross track direction is the heading that a UAV would fly directly from a starting point to a waypoint in the absence of wind.

"GUI" means graphical user interface, a display means for a computer screen.

"Heading" means the compass heading of the UAV.

"Course" means the direction of travel of the UAV over the ground. In the absence of wind, or in the presence of a straight tailwind or straight headwind, the course and the heading are the same direction. In the presence of cross wind, the course and the heading are different directions.

"Position" refers to a location in the air or over the ground. 'Position' is typically specified as Earth coordinates, latitude and longitude. A specification of position may also include altitude.

A "waypoint" is a position chosen as a destination for navigation of a route. A route has one or more waypoints. That is, a route is composed of waypoints, including at least one final waypoint, and one or more intermediate waypoints.

"TDMA" stands for Time Division Multiple Access, a technology for delivering digital wireless service using time-division multiplexing. TDMA works by dividing a radio frequency into time slots and then allocating slots to multiple calls. In this way, a single frequency can support multiple, simultaneous data channels. TDMA is used by GSM.

"GSM" stands for Global System for Mobile Communications, a digital cellular standard. GSM at this time is the de facto standard for wireless digital communications in Europe and Asia.

"CDPD" stands for Cellular Digital Packet Data, a data transmission technology developed for use on cellular phone frequencies. CDPD uses unused cellular channels to transmit data in packets. CDPD supports data transfer rates of up to 19.2 Kbps.

"GPRS" stands for General Packet Radio Service, a standard for wireless data communications which runs at speeds up to 150 Kbps, compared with current GSM systems which cannot support more than about 9.6 Kbps. GPRS, which supports a wide range of speeds, is an efficient use of limited bandwidth and is particularly suited for sending and receiving small bursts of data, such as e-mail and Web browsing, as well as large volumes of data.

"EDGE" stands for Enhanced Data Rates for GSM Evolution, a standard for wireless data communications supporting data transfer rates of more than 300 Kbps. GPRS and EDGE are considered interim steps on the road to UMTS.

"UMTS" stands for Universal Mobile Telecommunication System, a standard for wireless data communications supporting data transfer rates of up to 2 Mpbs. UMTS is also referred to W-CDMA for Wideband Code Division Multiple Access.

Exemplary Architecture for Navigating a UAV

Methods, systems, and products for navigating a UAV are explained with reference to the accompanying drawings, beginning with FIG. 1. FIG. 1 sets forth a system diagram illustrating relations among components of an exemplary system for navigating a UAV. The system of FIG. 1 includes UAV (100) which includes a GPS (Global Positioning System) receiver (not shown) that receives a steady stream of GPS data from satellites (190, 192). For convenience of explanation, only two GPS satellites are shown in FIG. 1, although the GPS satellite network in fact includes 24 GPS satellites.

The system of FIG. 1 may operate to navigate a UAV by receiving in a remote control device a user's selection of a GUI map pixel that represents a waypoint for UAV navigation. Each such pixel has a location on a GUI map, typically specified as a row and column position. Examples of remote control devices in FIG. 1 include mobile telephone (110), workstation (104), laptop computer (106), and PDA (Personal Digital Assistant) (120). Each such remote control device is capable of supporting a GUI display of a map of the surface of the Earth in which each pixel on the GUI map represents a position on the Earth.

Each remote control device also supports at least one user input device through which a user may enter the user's selection of a pixel. Examples of user input devices in the system of FIG. 1 include telephone keypad (122), workstation keyboard (114), workstation joystick (112), laptop keyboard (116) and PDA touch screen (118).

The system of FIG. 1 typically is capable of operating a remote control device to map the pixel's location on the GUI to Earth coordinates of a waypoint. The remote control device is often capable of receiving downlink telemetry including starting position from a GPS receiver on the UAV through the socket. In fact, the remote control device is often receiving downlink telemetry that includes a steady stream of GPS positions of the UAV. Receiving a starting position therefore is typically carried out by taking the current position of the UAV when the user selects the pixel as the starting position. In the example of FIG. 1, the remote control device generally receives the starting position from the UAV through wireless network (102). The remote control device is often capable of transmitting uplink telemetry including the coordinates of the waypoint, flight control instructions, or UAV instructions through a socket on the remote control devices.

Wireless network (102) is implemented using any wireless data transmission technology as will occur to those of skill in the art including, for example, TDMA, GSM, CDPD, GPRS, EDGE, and UMTS. In one embodiment, a data communications link layer is implemented using one of these technologies, a data communications network layer is implemented with the Internet Protocol ("IP"), and a data communications transmission layer is implemented using the Transmission Control Protocol ("TCP"). In such systems, telemetry between the UAV and remote control devices, including starting positions, UAV instructions, and flight control instructions, are transmitted using an application-level protocol such as, for example, the HyperText Transmission Protocol ("HTTP"), the Wireless Application Protocol ("WAP"), the Handheld Device Transmission Protocol ("HDTP"), or any other data communications protocol as will occur to those of skill in the art.

The system of FIG. 1 typically is capable of calculating a heading in dependence upon the starting position, the coordinates of the waypoint, and a navigation algorithm, identifying flight control instructions for flying the UAV on the heading, and transmitting the flight control instructions from the remote control device to the UAV.

The system of FIG. 1 is also capable of navigating the UAV (100) in dependence upon the digital resolution of an onboard digital camera (552). The system of FIG. 1 is capable of determining a desired digital resolution of an image of an object and piloting the UAV, under control of a navigation computer, in dependence upon the desired digital resolution of the image of the object. The object whose image is to be captured by the on-board digital camera may be any object as will occur to those of skill in the art. Often the object is a person or thing of interest that is currently being monitored by the UAV.

Commercial off-the-shelf high resolution digital cameras for use in navigating UAVs are currently available. One example of such a high resolution digital camera capable of being mounted on a UAV is the Pro Back digital camera available from Kodak.

Figure 2:
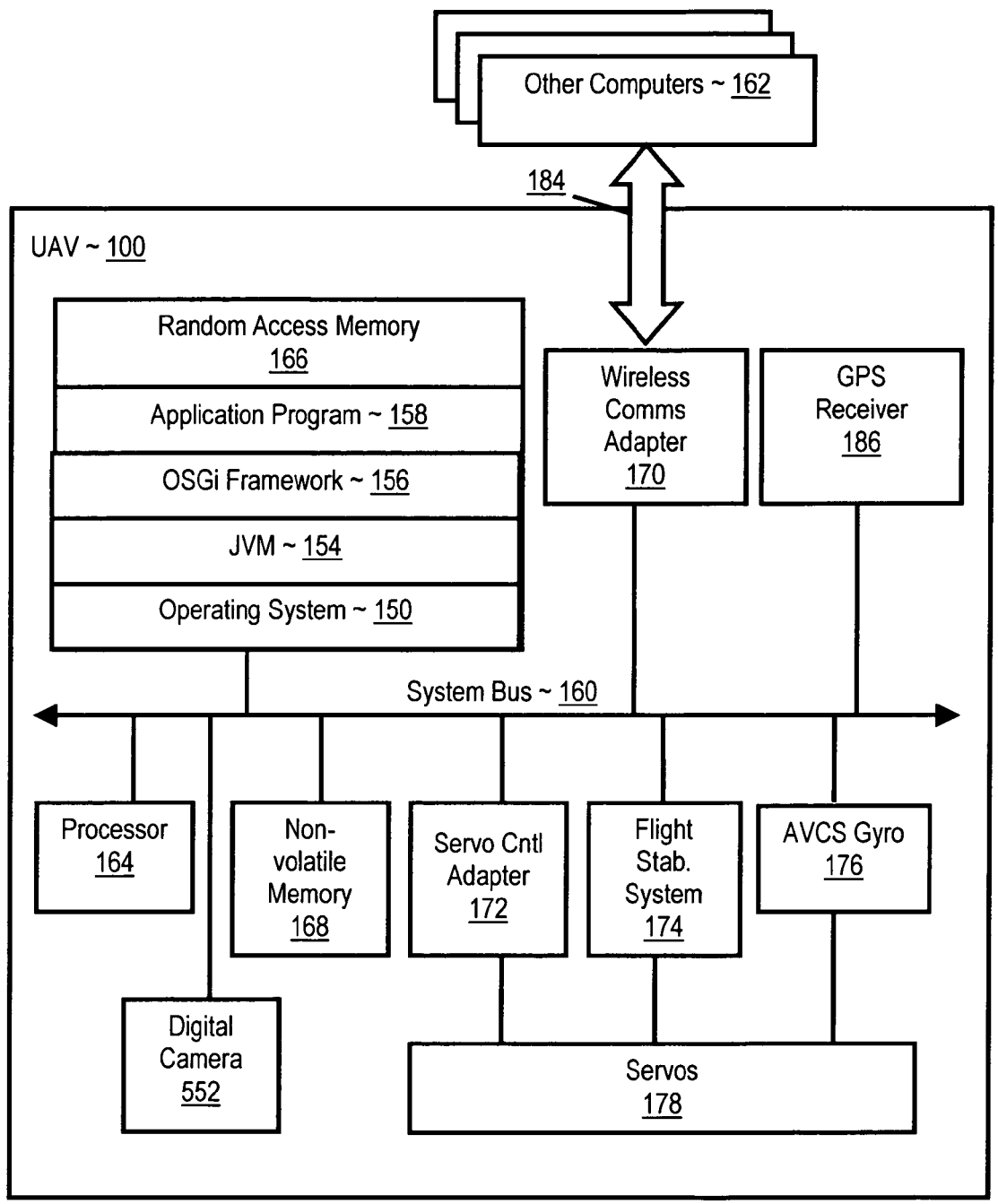
FIG. 2 is a block diagram of an exemplary UAV showing relations among components of included automated computing machinery.

UAVs according to embodiments of the present invention typically include, not only an aircraft, but also automated computing machinery capable of receiving GPS data, operating telemetry between the UAV and one or more remote control devices, and navigating a UAV among waypoints. FIG. 2 is a block diagram of an exemplary UAV showing relations among components of included automated computing machinery. In FIG. 2, UAV (100) includes a processor (164), also typically referred to as a central processing unit or 'CPU.' The processor may be a microprocessor, a programmable control unit, or any other form of processor useful according to the form factor of a particular UAV as will occur to those of skill in the art. Other components of UAV (100) are coupled for data transfer to processor (164) through system bus (160).

UAV (100) includes random access memory or 'RAM' (166). Stored in RAM (166) is an application program (158) that implements inventive methods according to embodiments of the present invention. In some embodiments, the application programming runs on an OSGi service framework (156). OSGi Stands for 'Open Services Gateway Initiative.' The OSGi specification is a Java-based application layer framework that provides vendor neutral application layer APIs and functions. An OSGi service framework (156) is written in Java and therefore typically runs on a Java Virtual Machine (JVM) (154) which in turn runs on an operating system (150). Examples of operating systems useful in UAVs according to the present invention include Unix, AIX™, and Microsoft Windows™.

In OSGi, the framework is a hosting platform for running 'services'. Services are the main building blocks for creating applications according to the OSGi. A service is a group of Java classes and interfaces that implement a certain feature. The OSGi specification provides a number of standard services. For example, OSGi provides a standard HTTP service that can respond to requests from HTTP clients, such as, for example, remote control devices according to embodiments of the present invention. That is, such remote control devices are enabled to communicate with a UAV having an HTTP service by use of data communications messages in the HTTP protocol.

Services in OSGi are packaged in 'bundles' with other files, images, and resources that the services need for execution. A bundle is a Java archive or 'JAR' file including one or more service implementations, an activator class, and a manifest file. An activator class is a Java class that the service framework uses to start and stop a bundle. A manifest file is a standard text file that describes the contents of the bundle.

The service framework in OSGi also includes a service registry. The service registry includes a service registration including the service's name and an instance of a class that implements the service for each bundle installed on the framework and registered with the service registry. A bundle may request services that are not included in the bundle, but are registered on the framework service registry. To find a service, a bundle performs a query on the framework's service registry.

The exemplary application program (158) of FIG. 2 is capable generally of navigating a UAV having an on-board digital camera in dependence upon a desired digital resolution of an image of an object being monitored by determining a desired digital resolution of the image and piloting the UAV in dependence upon the desired digital resolution to achieve an image of the object having the desired resolution.

In the UAV (100) of FIG. 2, software programs and other useful information may be stored in RAM or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

UAV (100) includes communications adapter (170) implementing data communications connections (184) to other computers (162), which may be wireless networks, satellites, remote control devices, servers, or others as will occur to those of skill in the art. Communications adapter (170) advantageously facilitates receiving flight control instructions from a remote control device. Communications adapters implement the hardware level of data communications connections through which UAVs transmit wireless data communications. Examples of communications adapters include wireless modems for dial-up connections through wireless telephone networks.

UAV (100) includes servos (178). Servos (178) are proportional control servos that convert digital control signals from system bus (160) into actual proportional displacement of flight control surfaces, ailerons, elevators, and the rudder. The displacement of flight control surfaces is 'proportional' to values of digital control signals, as opposed to the 'all or nothing' motion produced by some servos. In this way, ailerons, for example, may be set to thirty degrees, sixty degrees, or any other supported angle rather than always being only neutral or fully rotated. Several proportional control servos useful in various UAVs according to embodiments of the present invention are available from Futaba®.

UAV (100) includes a servo control adapter (172). A servo control adapter (172) is multi-function input/output servo motion controller capable of controlling several servos. An example of such a servo control adapter is the "IOSERVO" model from National Control Devices of Osceola, Mo. The IOSERVO is described on National Control Devices website at www.controlanything.com.

UAV (100) includes a flight stabilizer system (174). A flight stabilizer system is a control module that operates servos (178) to automatically return a UAV to straight and level flight, thereby simplifying the work that must be done by navigation algorithms. An example of a flight stabilizer system useful in various embodiments of UAVs according to the present invention is model Co-Pilot™ from FMA, Inc., of Frederick, Md. The Co-Pilot flight stabilizer system identifies a horizon with heat sensors, identifies changes in aircraft attitude relative to the horizon, and sends corrective signals to the servos (178) to keep the UAV flying straight and level.

UAV (100) includes an AVCS gyro (176). An AVCS gryo is an angular vector control system gyroscope that provides control signal to the servos to counter undesired changes in attitude such as those caused by sudden gusts of wind. An example of an AVCS gyro useful in various UAVs according to the present invention is model GYA350 from Futaba®.

The UAV (100) of FIG. 2 includes an on-board digital camera (552). Commercial off-the-shelf high resolution digital cameras for use in navigating UAVs are currently available. One example of such a high resolution digital camera capable of being mounted on a UAV is the Pro Back digital camera available from Kodak.

Figure 3:
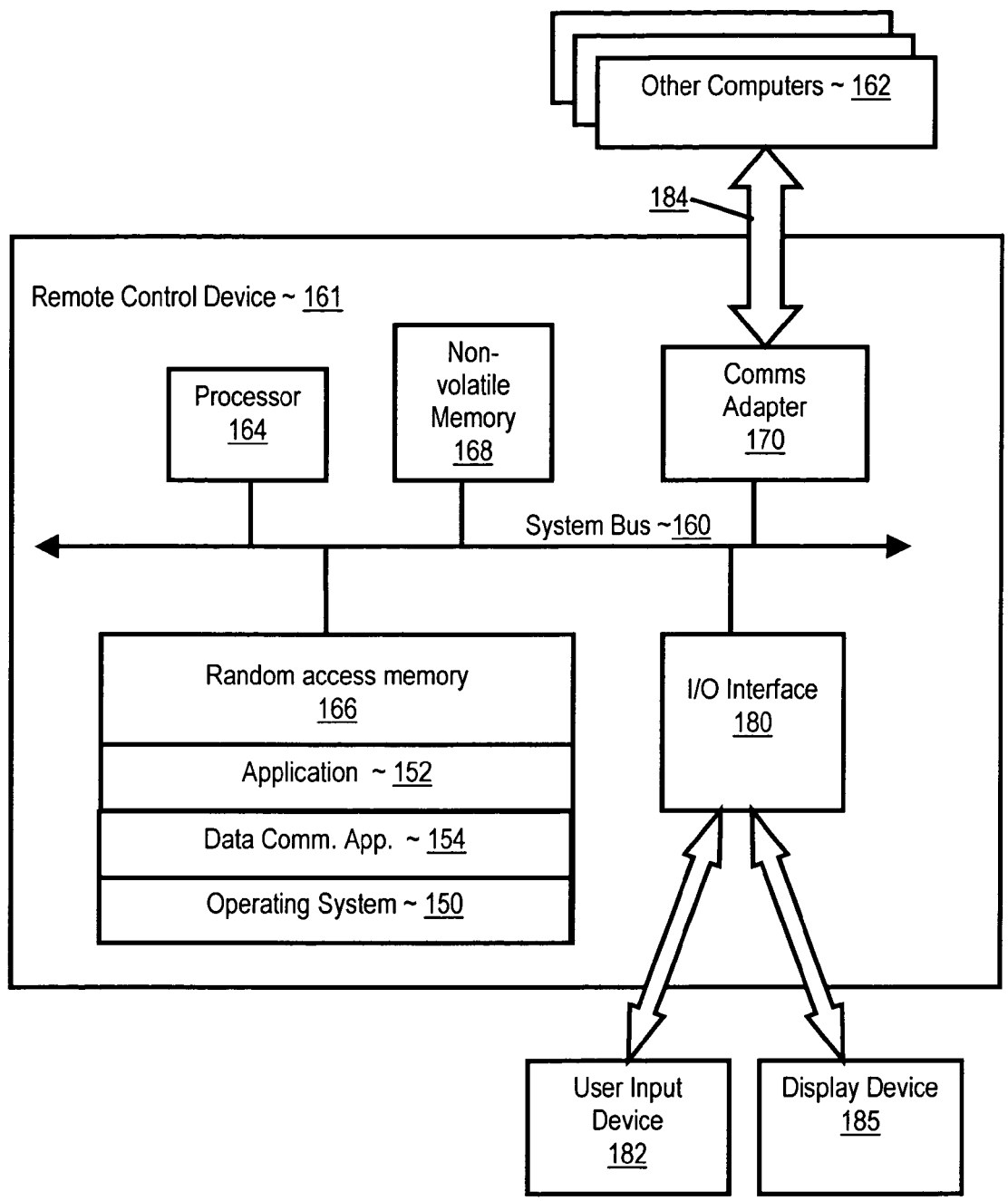
FIG. 3 is a block diagram of an exemplary remote control device showing relations among components that includes automated computing machinery.

Remote control devices according to embodiments of the present invention typically include automated computing machinery capable of receiving user selections of pixel on GUI maps, mapping the pixel to a waypoint location, receiving downlink telemetry including for example a starting position from a GPS receiver on the UAV, calculating a heading in dependence upon the starting position, the coordinates of the waypoint, and a navigation algorithm, identifying flight control instructions for flying the UAV on the heading, and transmitting the flight control instructions as uplink telemetry from the remote control device to the UAV. FIG. 3 is a block diagram of an exemplary remote control device showing relations among components of included automated computing machinery. In FIG. 3, remote control device (161) includes a processor (164), also typically referred to as a central processing unit or 'CPU.' The processor may be a microprocessor, a programmable control unit, or any other form of processor useful according to the form factor of a particular remote control device as will occur to those of skill in the art. Other components of remote control device (161) are coupled for data transfer to processor (164) through system bus (160).

Remote control device (161) includes random access memory or 'RAM' (166). Stored in RAM (166) an application program 152 that implements inventive methods of the present invention. In some embodiments, the application program (152) is OSGi compliant and therefore runs on an OSGi service framework installed (not shown) on a JVM (not shown). In addition, software programs and further information for use in implementing methods of navigating a UAV according to embodiments of the present invention may be stored in RAM or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

The exemplary application program (152) of FIG. 3 is also capable generally of navigating a UAV having an on-board digital camera in dependence upon a desired digital resolution of an image of an object. The application is capable of determining a desired digital resolution of the image and piloting the UAV in dependence upon the desired digital resolution to achieve an image of the object having the desired resolution by transmitting to the UAV flight control instructions that pilot the UAV to achieve the desired resolution of the image. Such flight control instruction include flight control instructions for changing the altitude of the UAV, changing a current flying pattern of the UAV and other flight control instructions that will occur to those of skill in the art.

Remote control device (161) includes communications adapter (170) implementing data communications connections (184) to other computers (162), including particularly computers on UAVs. Communications adapters implement the hardware level of data communications connections through which remote control devices communicate with UAVs directly or through networks. Examples of communications adapters include modems for wired dial-up connections, Ethernet (IEEE 802.3) adapters for wired LAN connections, 802.11b adapters for wireless LAN connections, and Bluetooth adapters for wireless microLAN connections.

The example remote control device (161) of FIG. 3 includes one or more input/output interface adapters (180). Input/output interface adapters in computers implement user-oriented input/output through, for example, software drivers and computer hardware for controlling output to display devices (185) such as computer display screens, as well as user input from user input devices (182) such as keypads, joysticks, keyboards, and touch screens.

Navigating a UAV Using GPS

Figure 4:
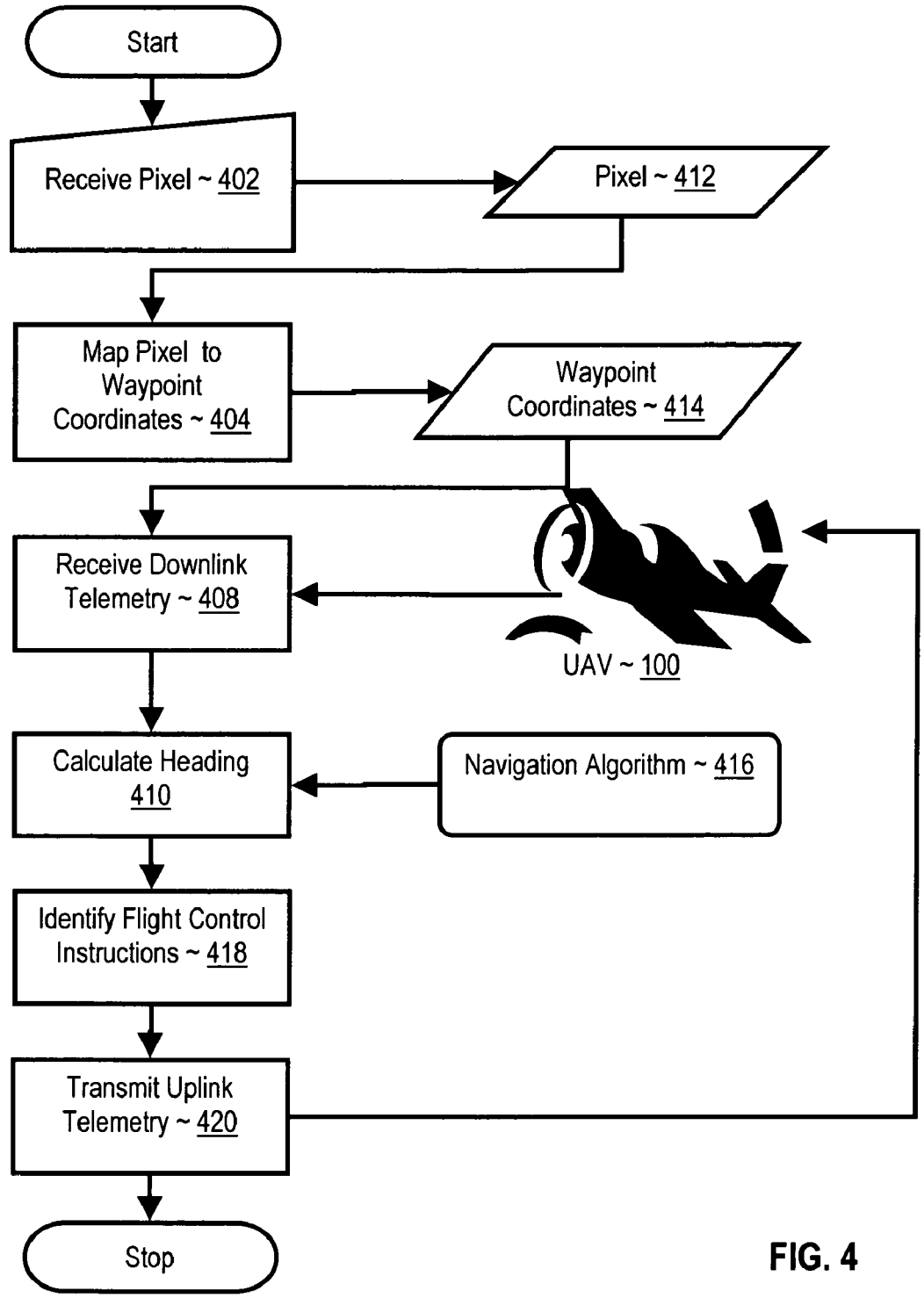
FIG. 4 sets forth a flow chart illustrating an exemplary method for navigating a UAV that includes receiving in a remote control device a user's selection of a GUI map pixel that represents a waypoint for UAV navigation.

FIG. 4 sets forth a flow chart illustrating an exemplary method for navigating a UAV that includes receiving (402) in a remote control device a user's selection of a GUI map pixel (412) that represents a waypoint for UAV navigation. The pixel has a location on the GUI. Such a GUI map display has many pixels, each of which represents at least one position on the surface of the Earth. A user selection of a pixel is normal GUI operations to take a pixel location, row and column, from a GUI input/output adapter driven by a user input device such as a joystick or a mouse. The remote control device can be a traditional 'ground control station,' an airborne PDA or laptop, a workstation in Earth orbit, or any other control device capable of accepting user selections of pixels from a GUI map.

The method of FIG. 4 includes mapping (404) the pixel's location on the GUI to Earth coordinates (414) of the waypoint. As discussed in more detail below with reference to FIG. 5, mapping (404) the pixel's location on the GUI to Earth coordinates of the waypoint (414) typically includes mapping pixel boundaries of the GUI map to corresponding Earth coordinates and identifying a range of latitude and a range of longitude represented by each pixel. Mapping (404) the pixel's location on the GUI to Earth coordinates of the waypoint (414) also typically includes locating a region on the surface of the Earth in dependence upon the boundaries, the ranges, and the location of the pixel on the GUI map.

The method of FIG. 4 also includes receiving (408) downlink telemetry, including a starting position from a GPS receiver on the UAV, from the UAV through a socket on the remote control device. In fact, the remote control device is receiving downlink telemetry that includes a steady stream of GPS positions of the UAV. Receiving a starting position therefore is typically carried out by taking the current position of the UAV when the user selects the pixel as the starting position.

A socket is one end-point of a two-way communication link between two application programs running on a network. In Java, socket classes are used to represent a connection between a client program and a server program. The java.net package provides two Java classes—Socket and ServerSocket—that implement the client side of the connection and the server side of the connection, respectively. In some embodiments of the present invention, a Java web server, is included in an OSGi framework on a remote control device. Often then, a socket on the remote control device would be considered a server-side socket, and a socket on the UAV would be considered a client socket. In other embodiments of the present invention, a Java web server, is included in an OSGi framework on the UAV. In such embodiments, a socket on the UAV would be considered a server-side socket, and a socket on a remote control device would be considered a client socket.

Use of a socket requires creating a socket and creating data streams for writing to and reading from the socket. One way of creating a socket and two data streams for use with the socket is shown in the following exemplary pseudocode segment:

```
uavSocket = new Socket( "computerAddress", 7);
outStream = new PrintWriter(uavSocket.getOutputStream( ), true);
inStream = new BufferedReader(new
     InputStreamReader(uavSocket.getInputStream( )));
```

The first statement in this segment creates a new socket object and names it "uavSocket." The socket constructor used here requires a fully qualified IP address of the machine the socket is to connect to, in this case the Java server on a remote control device or a UAV, and the port number to connect to. In this example, "computerAddress" is taken as a domain name that resolves to a fully qualified dotted decimal IP address. Alternatively, a dotted decimal IP address may be employed directly, as, for example, "195.123.001.001." The second argument in the call to the socket constructor is the port number. Port number 7 is the port on which the server listens in this example, whether the server is on a remote control device or on a UAV.

The second statement in this segment gets the socket's output stream and opens a Java PrintWriter object on it. Similarly, the third statement gets the socket's input stream and opens a Java BufferedReader object on it. To send data through the socket, an application writes to the PrintWriter, as, for example:

outStream.println(someWaypoint, macro, or Flight Control Instruction);

To receive data through the socket, an application reads from the BufferedReader, as show here for example:

a Waypoint, GPS data, macro, or flight control instruction=inStream.readLine( );

The method of FIG. 4 also includes calculating (410) a heading in dependence upon the starting position, the coordinates of the waypoint, and a navigation algorithm (416). Methods of calculating a heading are discussed in detail below in this specification.

The method of FIG. 4 includes identifying (418) flight control instructions for flying the UAV on the heading. Flight control instructions are specific commands that affect the flight control surfaces of the UAV. That is, instructions to move the flight control surfaces to affect the UAV's flight causing the UAV to turn, climb, descend, and so on. As an aid to further explanation, an exemplary method of identifying flight control instructions for flying on a calculated heading is provided:

receive new calculated heading from navigation algorithms
read current heading from downlink telemetry
if current heading is left of the calculated heading, identify flight control instruction: AILERONS LEFT 30 DEGREES
if current heading is right of the calculated heading, identify flight control instruction: AILERONS RIGHT 30 DEGREES
monitor current heading during turn
when current heading matches calculated heading, identify flight control instruction: FLY STRAIGHT AND LEVEL The method of FIG. 4 includes transmitting (420) uplink telemetry, including the flight instructions, through the socket to the UAV. Transmitting (420) the flight control instructions from the remote control device to the UAV may be carried out by use of any data communications protocol, including, for example, transmitting the flight control instructions as form data, URI encoded data, in an HTTP message, a WAP message, an HDML message, or any other data communications protocol message as will occur to those of skill in the art.

Figure 4A:
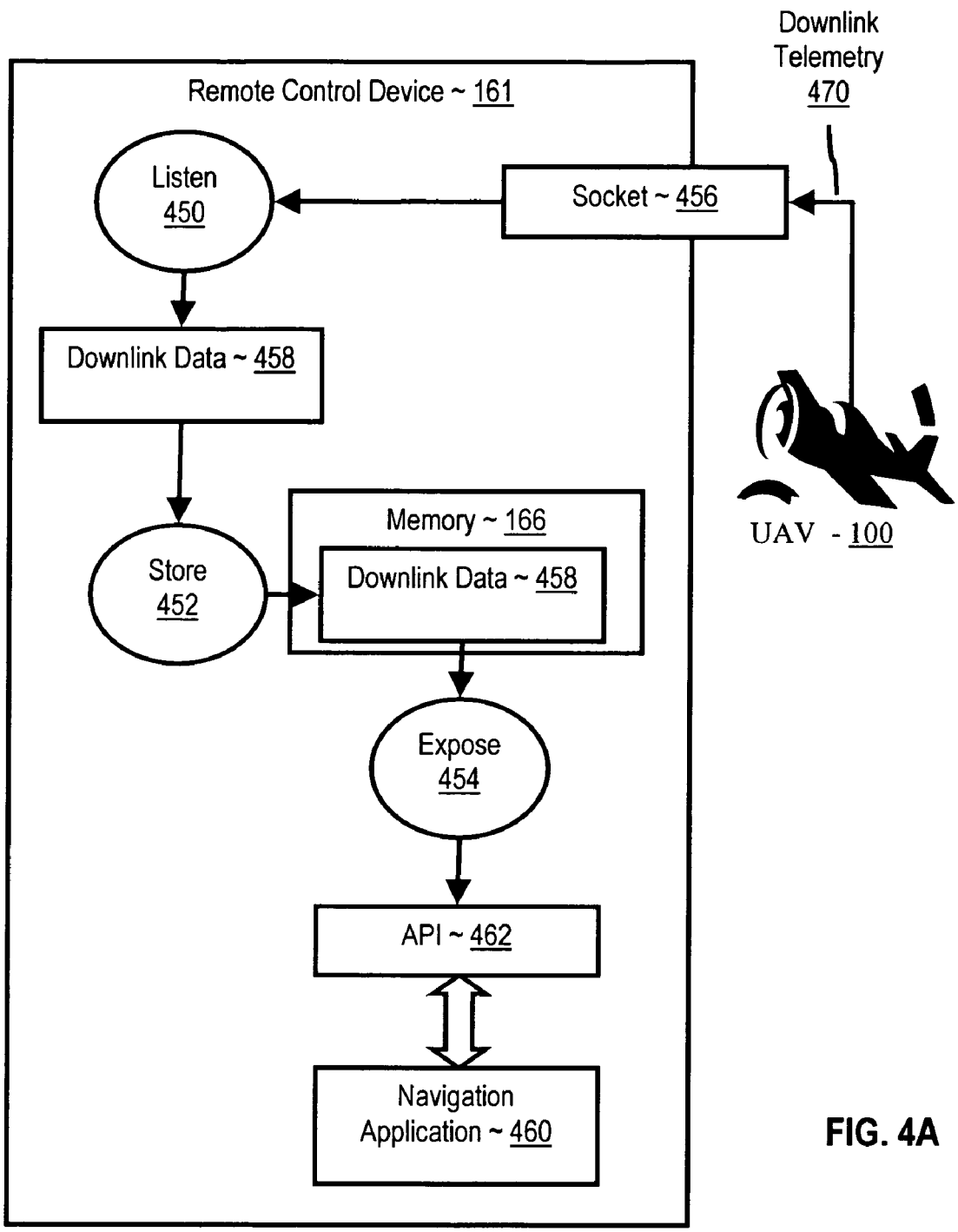
FIG. 4A is a data flow diagram illustrating an exemplary method for receiving downlink telemetry.

FIG. 4A is a data flow diagram illustrating an exemplary method for receiving downlink telemetry. The method of FIG. 4A includes listening (450) on the socket (456) for downlink data (458). Listening on a socket for downlink data may be implemented by opening a socket, creating an input stream for the socket, and reading data from the input stream, as illustrated, for example, in the following segment of pseudocode:

```
uavSocket = new Socket( "computerAddress", 7);
inStream = new BufferedReader(new
     InputStreamReader(uavSocket.getInputStream( )));
String downLinkData = inStream.readLine( );
```

This segment opens a socket object named "uavSocket" with an input stream named "inStream." Listening for downlink data on the socket is accomplished with a blocking call to inStream.readLine( ) which returns a String object name "downLinkData."

The method of FIG. 4A includes storing (452) downlink data (458) in computer memory (166) and exposing (454) the stored downlink data (458) through an API (462) to a navigation application (460). Downlink data typically is exposed through an 'API' (Application Programming Interface) by providing in a Java interface class public accessor functions for reading from member data elements in which the downlink data is stored. A navigation application wishing to access downlink data then may access the data by calling a public accessor methods, as, for example: String someDownLinkData=APIimpl.getDownLinkData( ).

In the method of FIG. 4A, the downlink telemetry (470) further comprises flight control instructions. It is counterintuitive that downlink telemetry contains flight control instruction when the expected data communications direction for flight control instructions ordinarily is in uplink from a remote control device to a UAV. It is useful to note, however, that flight control instructions can be uplinked from a multiplicity of remote control devices, not just one. A flight line technician with a handheld PDA can issue flight control instructions to a UAV that is also linked for flight control to a computer in a ground station. It is sometimes advantageous, therefore, for downlink telemetry to include flight control instructions so that one remote control device can be advised of the fact that some other remote control device issued flight control instructions to the same UAV.

Figure 4B:
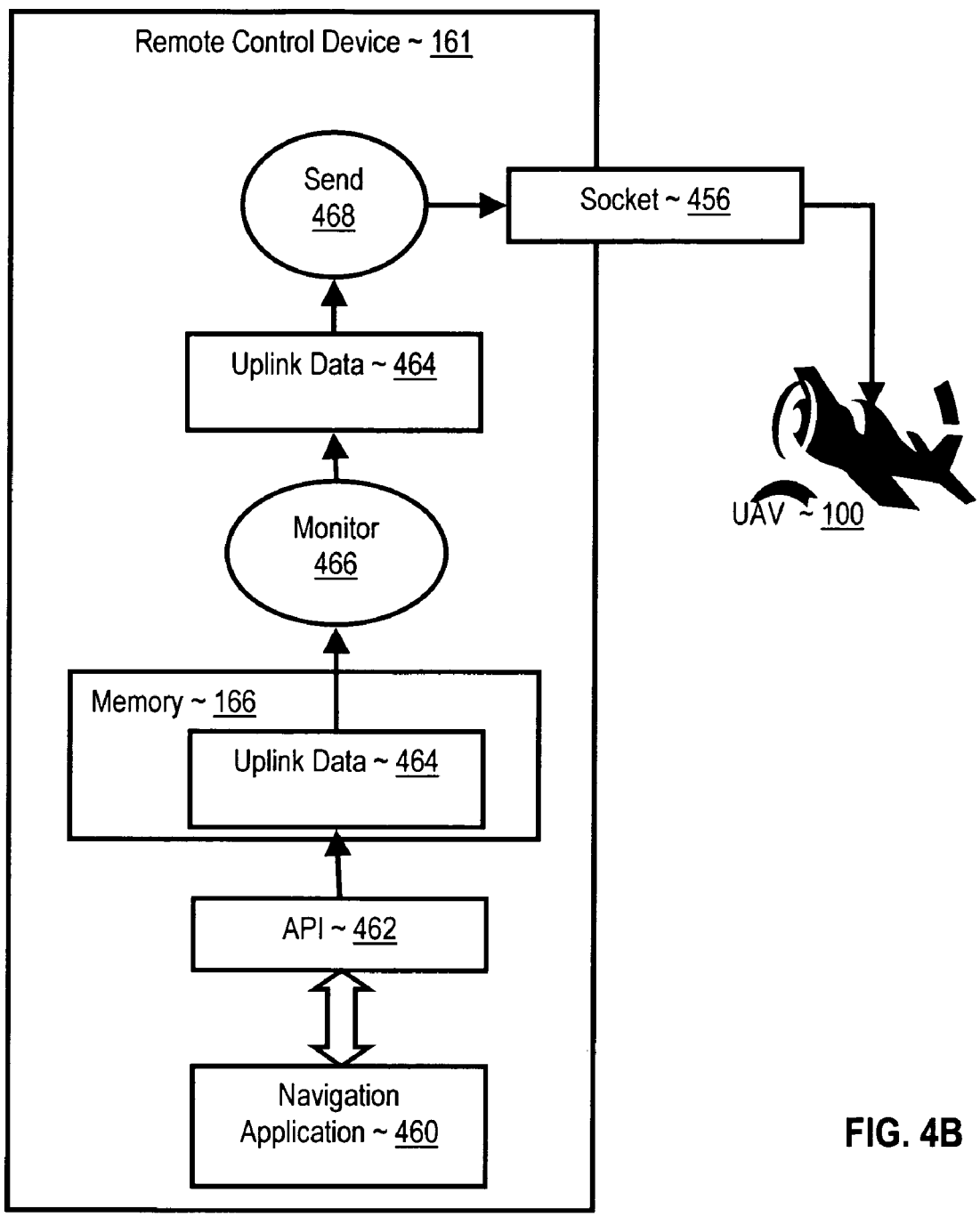
FIG. 4B sets forth a data flow diagram illustrating an exemplary method for transmitting uplink telemetry.

FIG. 4B sets forth a data flow diagram illustrating an exemplary method for transmitting uplink telemetry. The method of FIG. 4B includes monitoring (466) computer memory (166) for uplink data (464) from a navigation application (460). When uplink data (464) is presented, the method of FIG. 4B includes sending (468) the uplink data through the socket (456) to the UAV (100). Sending uplink data through a socket may be implemented by opening a socket, creating an output stream for a socket, and writing the uplink data to the output stream, as illustrated, for example, in the following segment of pseudocode:

```
uavSocket = new Socket( "computerAddress", 7)
outStream = new PrintWriter(uavSocket.getOutputStream( ), true)
outStream.println(String someUplinkData)
```

This segment opens a socket object named "uavSocket" with an output stream named "outStream." Sending uplink data through the socket is accomplished with a call to outStream.println( ) which takes as a call parameter a String object named "someUplinkData."

Macros

Although the flow chart of FIG. 4 illustrates navigating a UAV to a single waypoint, as a practical matter, embodiments of the present invention typically support navigating a UAV along a route having many waypoints, including a final waypoint and one or more intermediate waypoints. That is, methods of the kind illustrated in FIG. 4 may also include receiving user selections of a multiplicity of GUI map pixels representing waypoints, where each pixel has a location on the GUI and mapping each pixel location to Earth coordinates of a waypoint.

Such methods for navigating a UAV can also include assigning one or more UAV instructions to each waypoint and storing the coordinates of the waypoints and the UAV instructions in computer memory on the remote control device. A UAV instruction typically includes one or more instructions for a UAV to perform a task in connection with a waypoint. Exemplary tasks include turning on or off a camera installed on the UAV, turning on or off a light installed on the UAV, orbiting a waypoint, or any other task that will occur to those of skill in the art. UAV instructions to perform tasks in connection with a waypoint may be encoded in, for example, XML (the extensible Markup Language) as shown in the following exemplary XML segment:

```
<UAV-Instructions>
    <macro>
        <waypoint> 33° 44' 10" N 30° 15' 50" W </waypoint>
        <instruction> orbit </instruction>
        <instruction> videoCameraON </instruction>
        <instruction> wait30minutes </instruction>
        <instruction> videoCameraOFF </instruction>
        <instruction> nextWaypoint </instruction>
    </macro>
    <macro> </macro>
    <macro> </macro>
    <macro> </macro>
<UAV-instructions>
```

This XML example has a root element named 'UAV-instructions.' The example contains several subelements named 'macro.' One 'macro' subelement contains a waypoint location representing an instruction to fly to 33°44'10" N 30°15'50" W. That macro subelement also contains several instructions for tasks to be performed when the UAV arrives at the waypoint coordinates, including orbiting around the waypoint coordinates, turning on an on-board video camera, continuing to orbit for thirty minutes with the camera on, turning off the video camera, and continuing to a next waypoint. Only one macro set of UAV instructions is shown in this example, but that is not a limitation of the invention. In fact, such sets of UAV instructions may be of any useful size as will occur to those of skill in the art.

Exemplary methods of navigating a UAV also include flying the UAV to each waypoint in accordance with one or more navigation algorithms and operating the UAV at each waypoint in accordance with the UAV instructions for each waypoint. Operating the UAV at the waypoint in accordance with the UAV instructions for each waypoint typically includes identifying flight control instructions in dependence upon the UAV instructions for each waypoint and transmitting the flight control instructions as uplink telemetry through a socket. Flight control instructions identified in dependence upon the UAV instructions for each waypoint typically include specific flight controls to move the flight control surfaces of the UAV causing the UAV to fly in accordance with the UAV instructions. For example, in the case of a simple orbit, a flight control instruction to move the ailerons and hold them at a certain position causing the UAV to bank at an angle can effect an orbit around a waypoint.

Operating the UAV at the waypoint in accordance with the UAV instructions for each way point typically includes transmitting the flight control instructions as uplink data from the remote control device to the UAV. Transmitting the flight control instructions as uplink data from the remote control device to the UAV may be carried out by use of any data communications protocol, including, for example, transmitting the flight control instructions as form data, URI encoded data, in an HTTP message, a WAP message, an HDML message, or any other data communications protocol message as will occur to those of skill in the art.

Pixel Mapping

Figure 5:
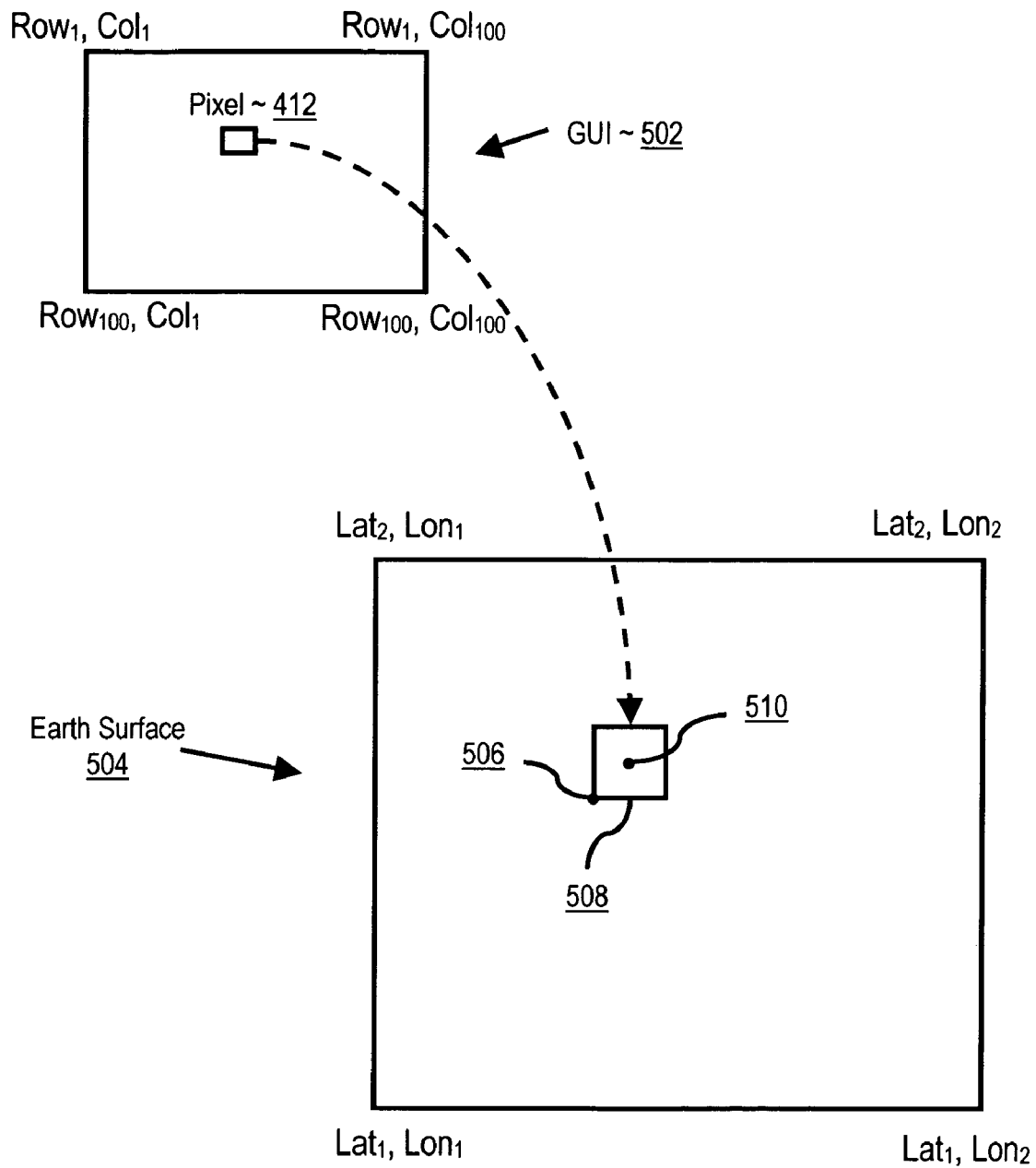
FIG. 5 sets forth a block diagram that includes a GUI displaying a map and a corresponding area of the surface of the Earth.

For further explanation of the process of mapping pixels' locations to Earth coordinates, FIG. 5 sets forth a block diagram that includes a GUI (502) displaying a map (not shown) and a corresponding area of the surface of the Earth (504). The GUI map has pixel boundaries identified as $Row_1$, $Col_1$;

$Row_1$, $Col_{100}$; $Row_{100}$, $Col_{100}$; and $Row_{100}$, $Col_1$. In this example, the GUI map is assumed to include 100 rows of pixels and 100 columns of pixels. This example of 100 rows and columns is presented for convenience of explanation; it is not a limitation of the invention. GUI maps according to embodiments of the present invention may include any number of pixels as will occur to those of skill in the art.

The illustrated area of the surface of the Earth has corresponding boundary points identified as $Lat_1$, $Lon_1$; $Lat_1$, $Lon_2$; $Lat_2$, $Lon_2$; and $Lat_2$, $Lon_1$. This example assumes that the distance along one side of surface area (504) is 100 nautical miles, so that the distance expressed in terms of latitude or longitude between boundary points of surface area (504) is 100 minutes or 1°40'.

In typical embodiments, mapping a pixel's location on the GUI to Earth coordinates of a waypoint includes mapping pixel boundaries of the GUI map to Earth coordinates. In this example, the GUI map boundary at $Row_1$, $Col_1$ maps to the surface boundary point at $Lat_1$, $Lon_1$; the GUI map boundary at $Row_1$, $Col_2$ maps to the surface boundary point at $Lat_1$, $Lon_2$; the GUI map boundary at $Row_2$, $Col_2$ maps to the surface boundary point at $Lat_2$, $Lon_2$; the GUI map boundary at $Row_2$, $Col_1$ maps to the surface boundary point at $Lat_2$, $Lon_1$.

Mapping a pixel's location on the GUI to Earth coordinates of a waypoint typically also includes identifying a range of latitude and a range of longitude represented by each pixel. The range of latitude represented by each pixel may be described as $(Lat_2-Lat_1)/N_{rows}$, where $(Lat_2-Lat_1)$ is the length in degrees of the vertical side of the corresponding surface (504), and $N_{rows}$ is the number of rows of pixels. In this example, $(Lat_2-Lat_1)$ is 1°40' or 100 nautical miles, and $N_{rows}$ is 100 rows of pixels. The range of latitude represented by each pixel in this example therefore is one minute of arc or one nautical mile.

Similarly, the range of longitude represented by each pixel may be described as $(Lon_2-Lon_1)/N_{cols}$, where $(Lon_2-Lon_1)$ is the length in degrees of the horizontal side of the corresponding surface (504), and $N_{cols}$ is the number of columns of pixels. In this example, $(Lon_2-Lon_1)$ is 1°40' or 100 nautical miles, and $N_{cols}$ is 100 columns of pixels. The range of longitude represented by each pixel in this example therefore is one minute of arc or one nautical mile.

Mapping a pixel's location on the GUI to Earth coordinates of a waypoint typically also includes locating a region on the surface of the Earth in dependence upon the boundaries, the ranges, and the location of the pixel on the GUI map. The region is the portion of the surface corresponding to the pixel itself. That region is located generally by multiplying in both dimensions, latitude and longitude, the range of latitude and longitude by column or row numbers of the pixel location on the GUI map. That is, a latitude for the surface region of interest is given by Expression 1.

$$Lat_1+P_{row}((Lat_2-Lat_1)/N_{rows}) \quad \text{(Exp. 1)}$$

In Expression 1:
 $Lat_1$ is the latitude of an origin point for the surface area (504) corresponding generally to the GUI map,
 $P_{row}$ is the row number of the pixel location on the GUI map, and
 $((Lat_2-Lat_1)/N_{rows})$ is the range of latitude represented by the pixel.

Similarly, a longitude for the surface region of interest is given by Expression 2.

$$Lon_1+P_{col}((Lon_2-Lon_1)/N_{cols}) \quad \text{(Exp. 2)}$$

In Expression 2:
 $Lon_1$ is the longitude of an origin point for the surface area (504) corresponding generally to the GUI map,
 $P_{col}$ is the column number of the pixel location on the GUI map, and
 $((Lon_2-Lon_1)/N_{cols})$ is the range of longitude represented by the pixel.

Referring to FIG. 5 for further explanation, Expressions 1 and 2 taken together identify a region (508) of surface area (504) that corresponds to the location of pixel (412) mapping the pixel location to the bottom left corner (506) of the region (508).

Advantageously, however, many embodiments of the present invention further map the pixel to the center of the region by adding one half of the length of the region's sides to the location of the bottom left corner (506).

More particularly, locating a region on the surface of the Earth in dependence upon the boundaries, the ranges, and the location of the pixel on the GUI map, as illustrated by Expression 3, may include multiplying the range of longitude represented by each pixel by a column number of the selected pixel, yielding a first multiplicand; and multiplying the range of longitude represented by each pixel by 0.5, yielding a second multiplicand; adding the first and second multiplicands to an origin longitude of the GUI map.

$$Lon_1+P_{col}((Lon_2-Lon_1)/N_{cols})+0.5((Lon_2-Lon_1)/N_{cols}) \quad \text{(Exp. 3)}$$

In Expression 3, the range of longitude represented by each pixel is given by $((Lon_2-Lon_1)/N_{cols})$, and the first multiplicand is $P_{col}((Lon_2-Lon_1)/N_{cols})$. The second multiplicand is given by $0.5((Lon_2-Lon_1)/N_{cols})$.

Similarly, locating a region on the surface of the Earth in dependence upon the boundaries, the ranges, and the location of the pixel on the GUI map, as illustrated by Expression 4, typically also includes multiplying the range of latitude represented by each pixel by a row number of the selected pixel, yielding a third multiplicand; multiplying the range of latitude represented by each pixel by 0.5, yielding a fourth multiplicand; and adding the third and fourth multiplicands to an origin latitude of the GUI map.

$$Lat_1+P_{row}((Lat_2-Lat_1)/N_{rows})+0.5((Lat_2-Lat_1)/N_{rows}) \quad \text{(Exp. 4)}$$

In Expression 4, the range of latitude represented by each pixel is given by $((Lat_2-Lat_1)/N_{rows})$, and the third multiplicand is $P_{row}((Lat_2-Lat_1)/N_{rows})$. The fourth multiplicand is given by $0.5((Lat_2-Lat_1)/N_{rows})$. Expressions 3 and 4 taken together map the location of pixel (412) to the center (510) of the located region (508).

Navigation on a Heading to a Waypoint

Figure 6:
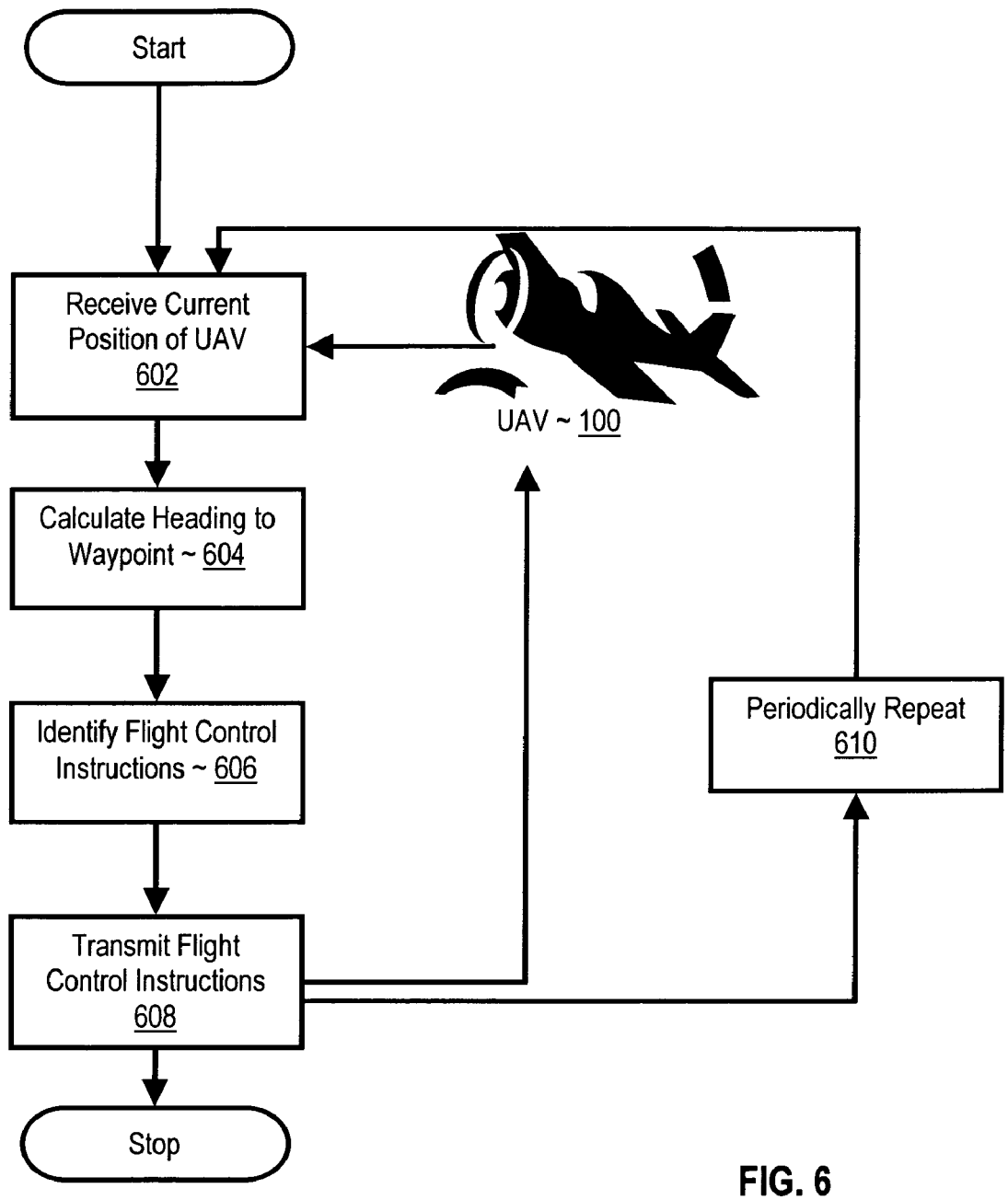
FIG. 6 sets forth a flow chart illustrating an exemplary method of navigating a UAV in accordance with a navigation algorithm.

An exemplary method of navigating in accordance with a navigation algorithm is explained with reference to FIGS. 6 and 7. FIG. 6 sets forth a flow chart illustrating an exemplary method of navigating a UAV in accordance with a navigation algorithm, and FIG. 7 sets forth a line drawing illustrating a flight path produced by application of the method of FIG. 6.

The method of FIG. 6 includes periodically repeating (610) the steps of, receiving (602) in the remote control device from the GPS receiver a current position of the UAV, and calculating (604) a new heading from the current position to the waypoint. The method of FIG. 6 also includes identifying (606) flight control instructions for flying the UAV on the new heading, and transmitting (608), from the remote control device to the UAV, the flight control instructions for flying the UAV on the new heading. In this method, if $Lon_1$, $Lat_1$ is taken as the current position, and $Lon_2$, $Lat_2$ is taken as the waypoint position, then the new heading may be calculated generally as the inverse tangent of $((Lat_2-Lat_1)/(Lon_2-Lon_1))$.

Figure 7:
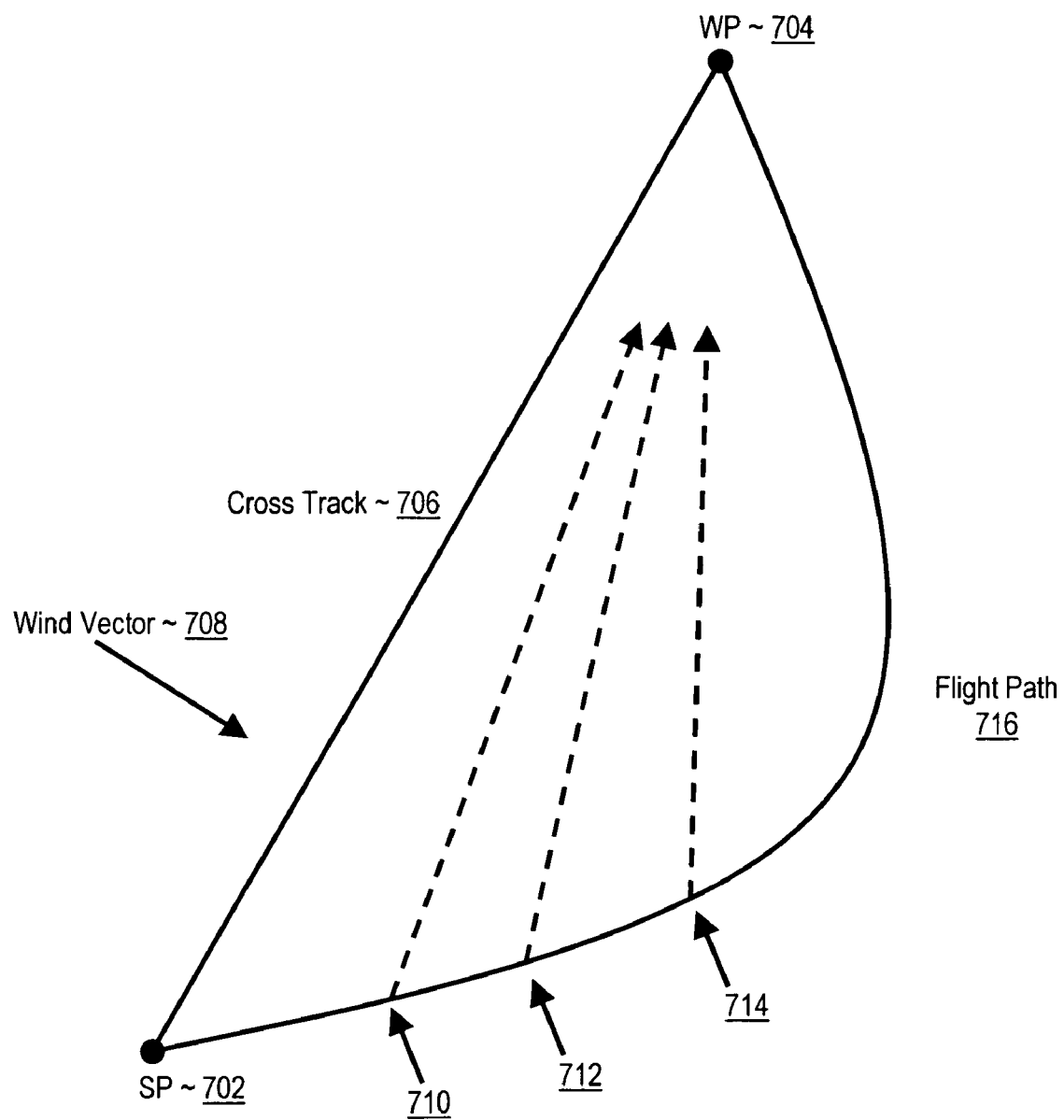
FIG. 7 sets forth a line drawing illustrating a flight path produced by application of the method of FIG. 6.

FIG. 7 shows the effect of the application of the method of FIG. 6. In the example of FIG. 7, a UAV is flying in a cross wind having cross wind vector (708). Curved flight path (716) results from periodic calculations according to the method of FIG. 6 of a new heading straight from a current location to the waypoint. FIG. 7 shows periodic repetitions of the method of FIG. 6 at plot points (710, 712, 714). For clarity of explanation, only three periodic repetitions are shown, although that is not a limitation of the invention. In fact, any number of periodic repetitions may be used as will occur to those of skill in the art.

Navigation with Headings Set to a Cross Track Direction

Figure 8:
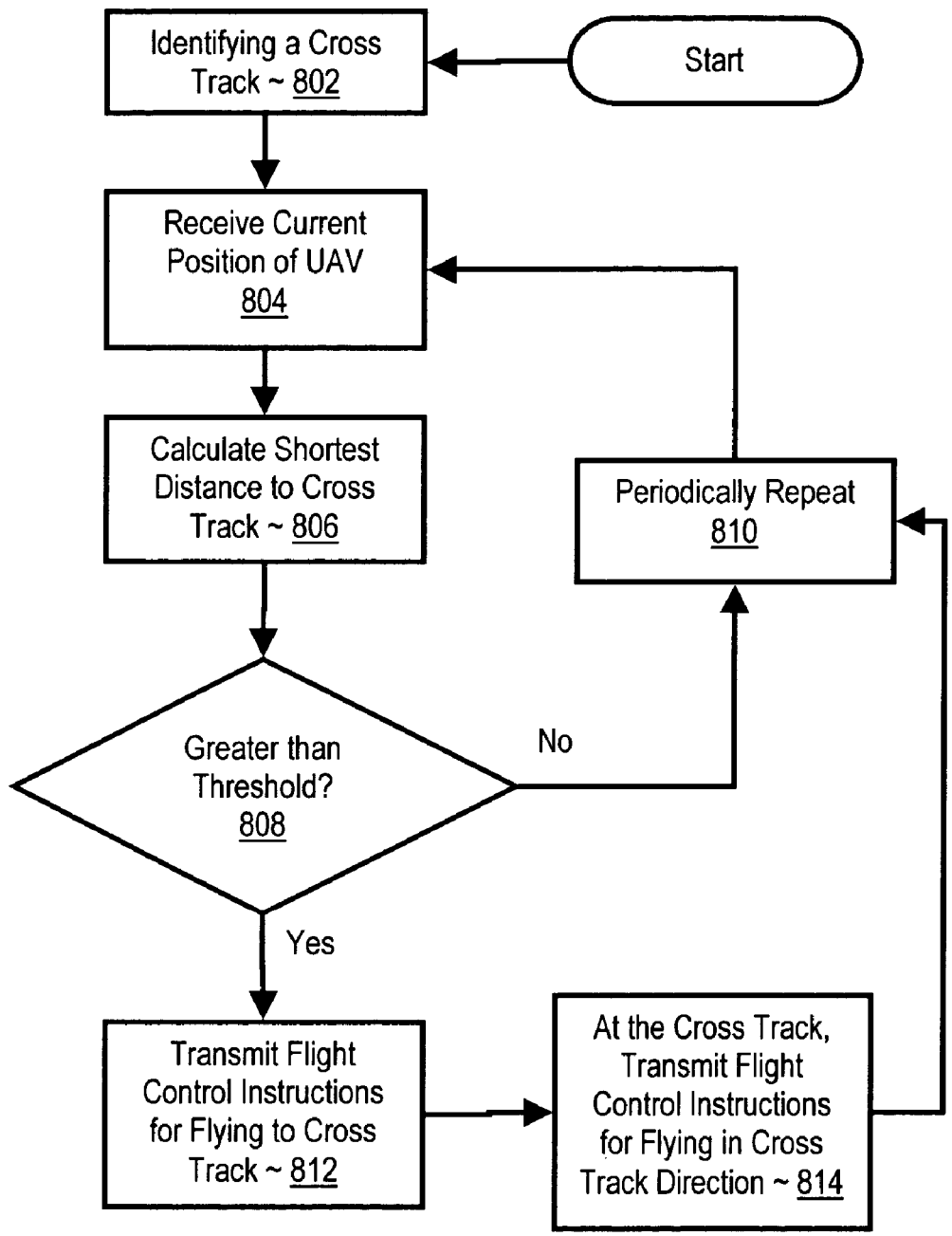
FIG. 8 sets forth a flow chart illustrating an exemplary method of navigating a UAV in accordance with a navigation algorithm.

A further exemplary method of navigating in accordance with a navigation algorithm is explained with reference to FIGS. 8 and 9. FIG. 8 sets forth a flow chart illustrating an exemplary method of navigating a UAV in accordance with a navigation algorithm, and FIG. 9 sets forth a line drawing illustrating a flight path produced by application of the method of FIG. 8. The method of FIG. 8 includes identifying (802) a cross track between the starting point and the waypoint. A cross track is a fixed course from a starting point directly to a waypoint. If $Lon_1$, $Lat_1$ is taken as the position of a starting point, and $Lon_2$, $Lat_2$ is taken as the waypoint position, then a cross track is identified by $Lon_1$, $Lat_1$ and $Lon_2$, $Lat_2$. A cross track has a direction, a 'cross track direction,' that is the direction straight from a starting point to a waypoint, and it is often useful to characterize a cross track by its cross track direction. The cross track direction for a cross track identified by starting point $Lon_1$, $Lat_1$ and waypoint position $Lon_2$, $Lat_2$ may be calculated generally as the inverse tangent of $((Lat_2-Lat_1)/(Lon_2-Lon_1))$.

The method of FIG. 8 includes periodically repeating (810) the steps of receiving (804) in the remote control device from the GPS receiver a current position of the UAV, and calculating (806) a shortest distance between the current position and the cross track. If the shortest distance between the current position and the cross track is greater than a threshold distance (808), the method of FIG. 8 includes transmitting (812) flight control instructions that pilot the UAV toward the cross track, and, when the UAV arrives at the cross track, transmitting (814) flight control instructions that pilot the UAV in a cross track direction toward the waypoint.

Figure 9:
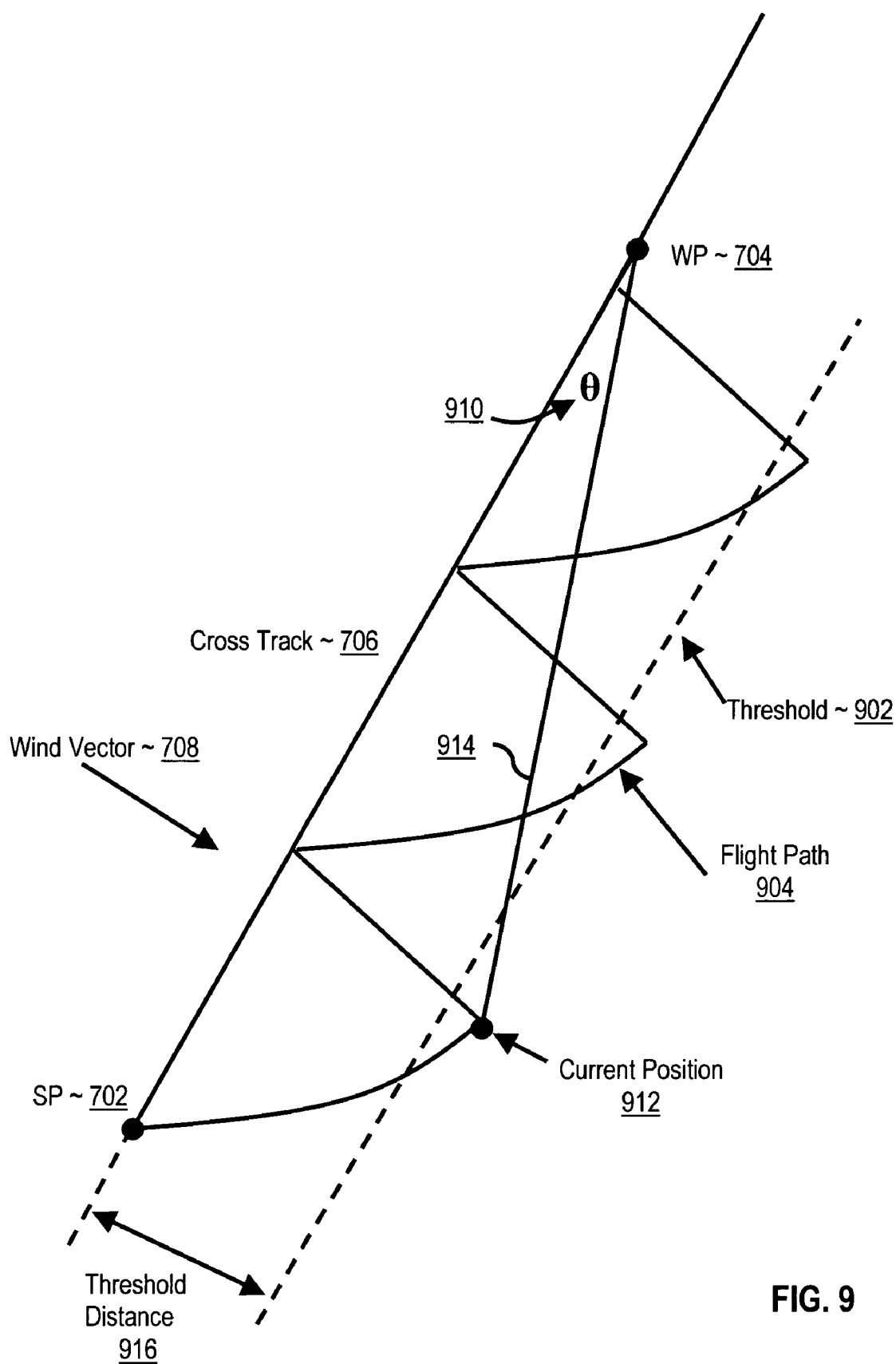
FIG. 9 sets forth a line drawing illustrating a flight path produced by application of the method of FIG. 8.

FIG. 9 illustrates calculating a shortest distance between the current position and a cross track. In the example of FIG. 9, calculating a shortest distance between the current position and a cross track includes calculating the distance from a current position (912) to the waypoint (704). In the example of FIG. 9, the distance from the current position (912) to the waypoint (704) is represented as the length of line (914). For current position $Lon_1$, $Lat_1$ and waypoint position $Lon_2$, $Lat_2$, the distance from a current position (912) to the waypoint (704) is given by the square root of $(Lat_2-Lat_1)^2+(Lon_2-Lon_1)^2$.

In this example, calculating a shortest distance between the current position and a cross track also includes calculating the angle (910) between a direction from the current position (912) to the waypoint (704) and a cross track direction. In the example of FIG. 9, the direction from the current position (912) to the waypoint (704) is represented as the direction of line (914). In the example of FIG. 9, the cross track direction is the direction of cross track (706). The angle between a direction from the current position to the waypoint and a cross track direction is the difference between those directions.

In the current example, calculating a shortest distance between the current position and a cross track also includes calculating the tangent of the angle between a direction from the current position to the waypoint and a cross track direction and multiplying the tangent of the angle by the distance from the current position to the waypoint.

FIG. 9 also shows the effect of the application of the method of FIG. 8. In the example of FIG. 9, a UAV is flying in a cross wind having cross wind vector (708). The flight path (904) results from periodic calculations according to the method of FIG. 8 of a shortest distance between a current position and the cross track (706), flying the UAV back to the cross track and then flying in the direction of the cross track whenever the distance from the cross track exceeds a predetermined threshold distance (916).

Headings Set to Cross Track Direction with Angular Thresholds

Figure 10:
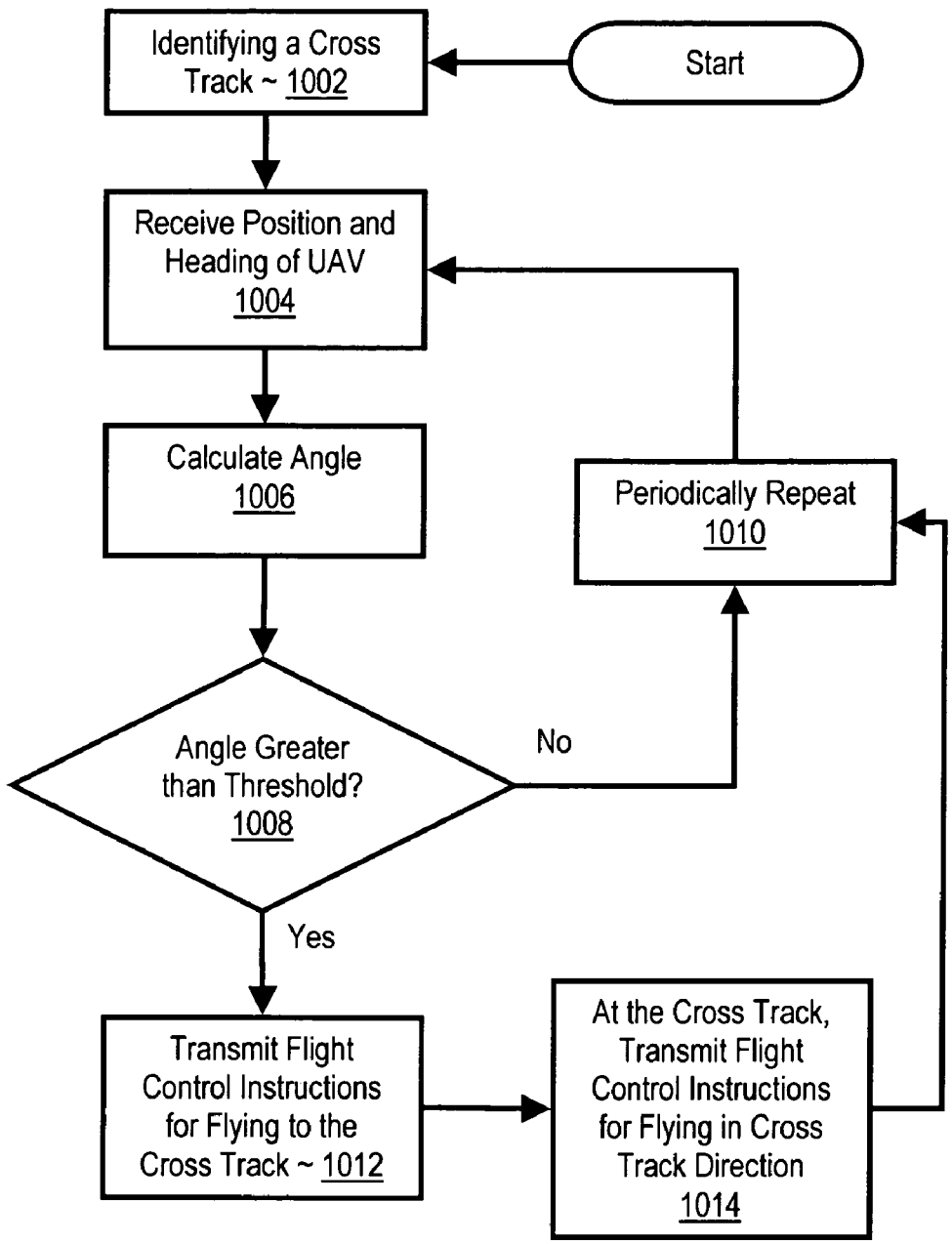
FIG. 10 sets forth a flow chart illustrating an exemplary method of navigating a UAV in accordance with a navigation algorithm.

A further exemplary method of navigating in accordance with a navigation algorithm is explained with reference to FIGS. 10 and 11. FIG. 10 sets forth a flow chart illustrating an exemplary method of navigating a UAV in accordance with a navigation algorithm, and FIG. 11 sets forth a line drawing illustrating a flight path produced by application of the method of FIG. 10.

In the method of FIG. 10, piloting in accordance with a navigation algorithm includes identifying (1002) a cross track having a cross track direction between the starting point and the waypoint. As described above, a cross track is identified by a position of a starting point and a waypoint position. For a starting point position of $Lon_1$, $Lat_1$ and a waypoint position of $Lon_2$, $Lat_2$, a cross track is identified by $Lon_1$, $Lat_1$ and $Lon_2$, $Lat_2$. In addition, it is often also useful to characterize a cross track by its cross track direction. The cross track direction for a cross track identified by starting point $Lon_1$, $Lat_1$ and waypoint position $Lon_2$, $Lat_2$ may be calculated generally as the inverse tangent of $((Lat_2-Lat_1)/(Lon_2-Lon_1))$.

In the method of FIG. 10, navigating a UAV in accordance with a navigation algorithm includes periodically repeating (1010) the steps of receiving (1004) in the remote control device from the GPS receiver a current position and a current heading of the UAV, and calculating (1006) an angle between the direction from the current position to the waypoint and a cross track direction. If the angle is greater than a threshold angle (1008), the method of FIG. 10 includes transmitting (1012) flight control instructions that pilot the UAV toward the cross track, and, upon arriving at the cross track, transmitting (1014) flight control instructions that pilot the UAV in the cross track direction toward the waypoint.

Transmitting (1012) flight control instructions that pilot the UAV toward the cross track is carried out by transmitting flight control instructions to turn to a heading no more than ninety degrees from the cross track direction, turning to the left if the current position is right of the cross track and to the right if the current position is left of the cross track. Transmitting (1014) flight control instructions that pilot the UAV in the cross track direction toward the waypoint transmitting flight control instructions to turn the UAV to the cross track direction and then flying straight and level on the cross track direction.

Figure 11:
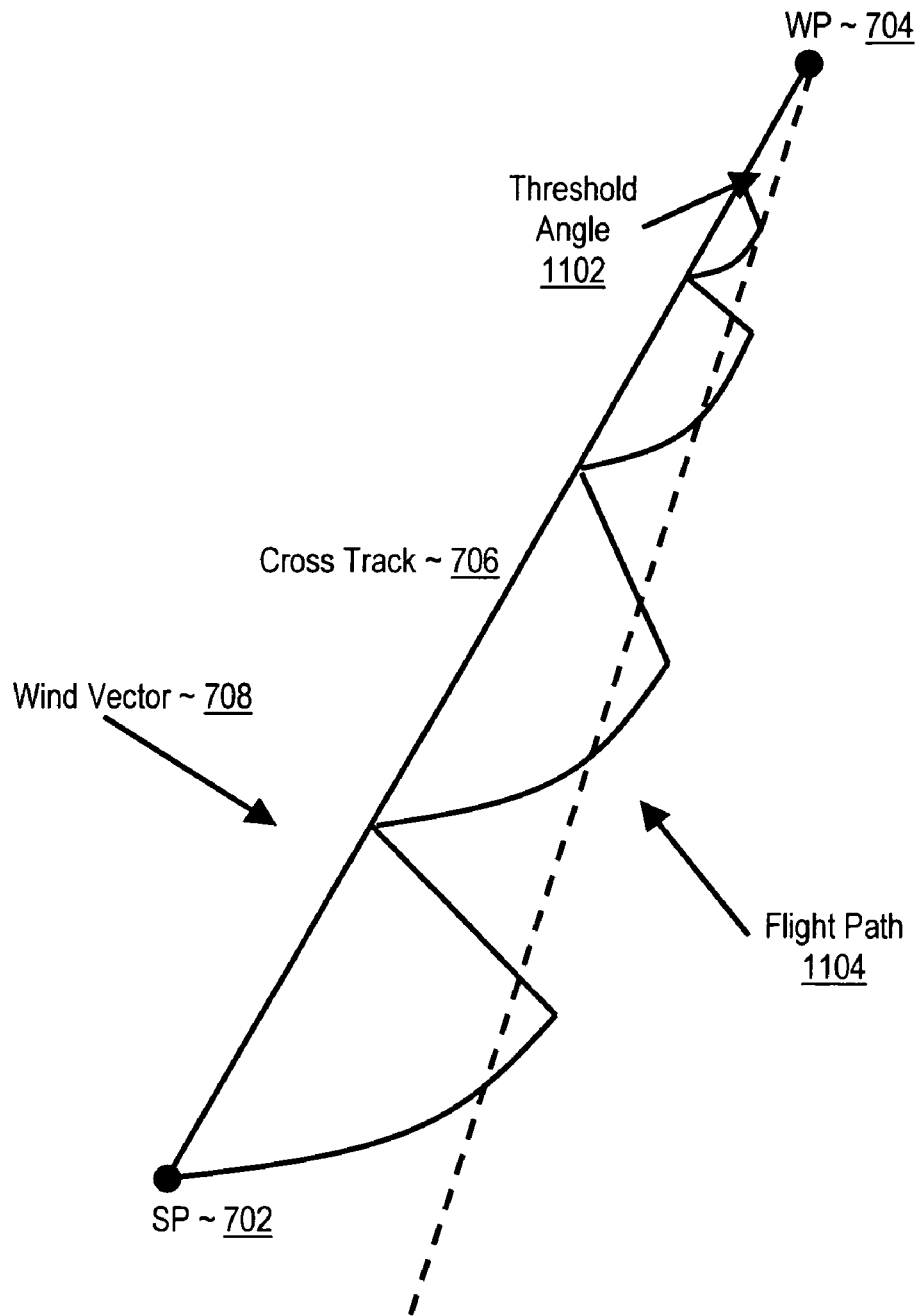
FIG. 11 sets forth a line drawing illustrating a flight path produced by application of the method of FIG. 10.

FIG. 11 shows the effect of the application of the method of FIG. 10. In the example of FIG. 11, a UAV is flying in a cross wind having cross wind vector (708). The flight path (1104)

results from periodically transmitting flight control instructions to fly the UAV, according to the method of FIG. 10, back to the cross track and then in the direction of the cross track whenever an angle between the direction from the current position to the waypoint and a cross track direction exceeds a predetermined threshold angle.

In many embodiments of the method of FIG. 10, the threshold angle is a variable whose value varies in dependence upon a distance between the UAV and the waypoint. In typical embodiments that vary the threshold angle, the threshold angle is increased as the UAV flies closer to the waypoint. It is useful to increase the threshold angle as the UAV flies closer to the waypoint to reduce the risk of excessive 'hunting.' That is, because the heading is the cross track direction, straight to the WP rather than cross wind, if the angle remains the same, the distance that the UAV needs to be blown off course to trigger transmitting flight control signals instructing the UAV to return to the cross track gets smaller and smaller until the UAV is flying to the cross track, turning to the cross track direction, getting blown immediately across the threshold, flying back the cross track, turning to the cross track direction, getting blown immediately across the threshold, and so on, and so on, in rapid repetition. Increasing the threshold angle as the UAV flies closer to the waypoint increases the lateral distance available for wind error before triggering the transmission of flight instructions to return to the cross track, thereby reducing this risk of excessive hunting.

Figure 12:
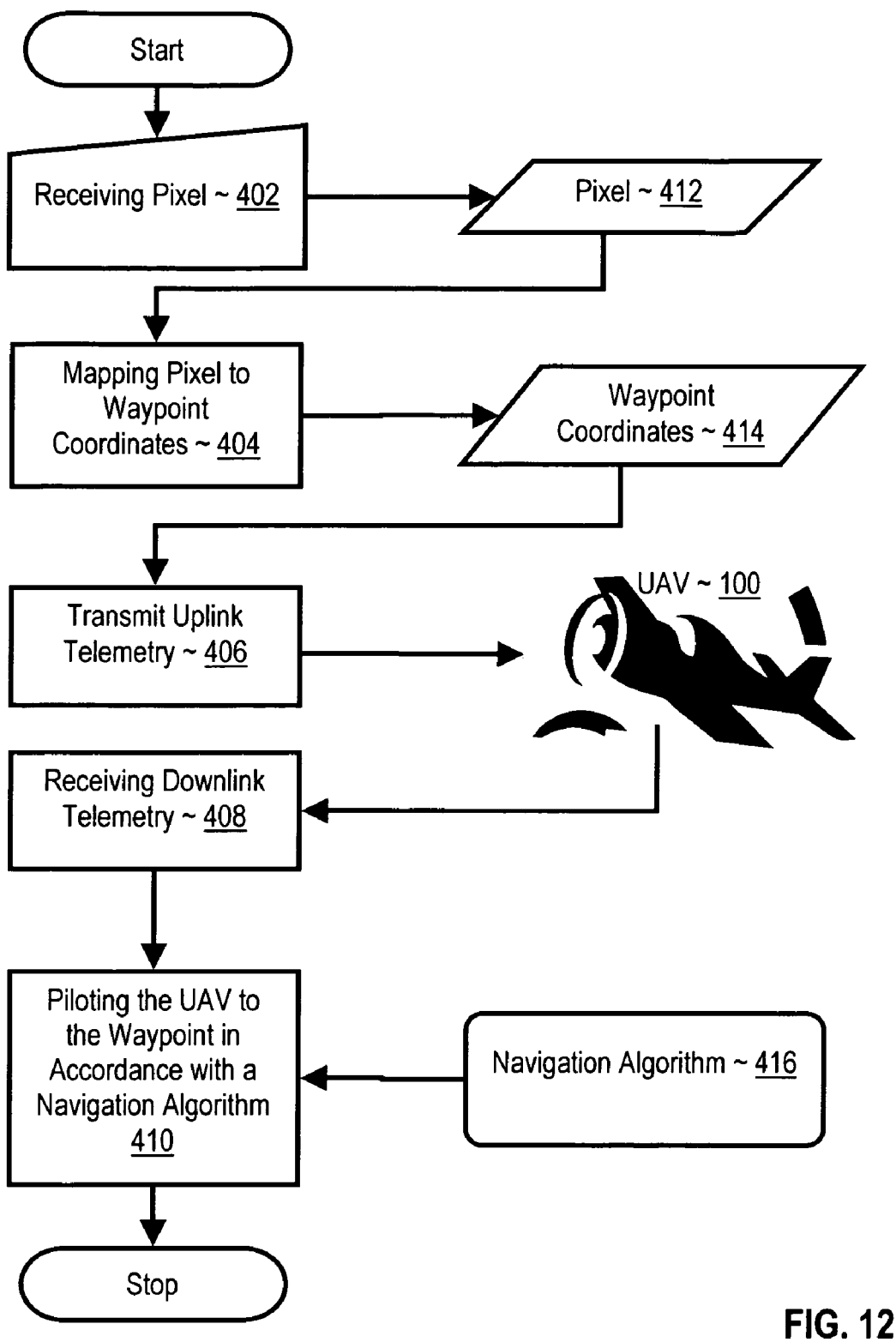
FIG. 12 sets forth a flow chart illustrating an exemplary method for navigating a UAV that includes receiving in a remote control device a user's selection of a GUI map pixel that represents a waypoint for UAV navigation.

FIG. 12 sets forth a flow chart illustrating an exemplary method for navigating a UAV that includes receiving (402) in a remote control device a user's selection of a GUI map pixel (412) that represents a waypoint for UAV navigation. The pixel has a location on the GUI. Such a GUI map display has many pixels, each of which represents at least one position on the surface of the Earth. A user selection of a pixel is normal GUI operations to take a pixel location, row and column, from a GUI input/output adapter driven by a user input device such as a joystick or a mouse. The remote control device can be a traditional 'ground control station,' an airborne PDA or laptop, a workstation in Earth orbit, or any other control device capable of accepting user selections of pixels from a GUI map.

The method of FIG. 12 includes mapping (404) the pixel's location on the GUI to Earth coordinates of the waypoint (414). As discussed in more detail above with reference to FIG. 5, mapping (404) the pixel's location on the GUI to Earth coordinates of the waypoint (414) typically includes mapping pixel boundaries of the GUI map to corresponding Earth coordinates and identifying a range of latitude and a range of longitude represented by each pixel. Mapping (404) the pixel's location on the GUI to Earth coordinates of the waypoint (414) also typically includes locating a region on the surface of the Earth in dependence upon the boundaries, the ranges, and the location of the pixel on the GUI map.

The method of FIG. 12 also includes transmitting (406) uplink telemetry, including the coordinates of the waypoint, to the UAV through a socket on the remote control device. Transmitting (406) uplink telemetry, including the coordinates of the waypoint, to the UAV through a socket on the remote control device may be carried out by use of any data communications protocol, including, for example, transmitting the coordinates as form data, URI encoded data, in an HTTP message, a WAP message, an HDML message, or any other data communications protocol message as will occur to those of skill in the art. Transmitting uplink telemetry through a socket may be implemented by opening a socket, creating an output stream for the socket, and writing uplink telemetry data to the output stream, as illustrated, for example, in the following segment of pseudocode:

```
uavSocket = new Socket( "computer Address", 7);
outStream = new PrintWriter(uavSocket.getOutputStream( ), true);
outStream.println(String someUplinkData);
```

This segment opens a socket object named "uavSocket" with an output stream named "outStream." Transmitting uplink telemetry through the socket is accomplished with a call to outstream.println( ) which takes as a call parameter a String object named "someUplinkData."

The method of FIG. 12 also includes receiving (408) downlink telemetry, including a starting position from a GPS receiver, from the UAV through the socket and piloting (410) the UAV, under control of a navigation computer on the UAV, from the starting position to the waypoint in accordance with a navigation algorithm. Methods of piloting a UAV according to a navigation algorithm are discussed in detail below in this specification.

Receiving downlink telemetry through a socket may be implemented by opening a socket, creating an input stream for the socket, and reading data from the input stream, as illustrated, for example, in the following segment of pseudocode:

```
uavSocket = new Socket( "computerAddress", 7);
inStream = new BufferedReader(new
        InputStreamReader(uavSocket.getInputStream( )));
String downLinkTelemetry = inStream.readLine( );
```

This segment opens a socket object named "uavSocket" with an input stream named "inStream." Receiving downlink telemetry through the socket is accomplished with a blocking call to inStream.readLine( ) which returns a String object name "downLinkTelemetry."

In the method of FIG. 12, downlink telemetry may include Earth coordinates of waypoints as well as one or more UAV instructions. It is counterintuitive that downlink telemetry contains waypoint coordinates and UAV instructions when the expected data communications direction for waypoint coordinates and UAV instructions ordinarily is in uplink from a remote control device to a UAV. It is useful to note, however, that waypoint coordinates and UAV instructions can be uplinked from a multiplicity of remote control devices, not just one. A flight line technician with a handheld PDA can issue waypoint coordinates and UAV instructions to a UAV that is also linked for flight control to a computer in a ground station. It is sometimes advantageous, therefore, for downlink telemetry to include waypoint coordinates or UAV instructions so that one remote control device can be advised of the fact that some other remote control device issued waypoint coordinates or UAV instructions to the same UAV.

Macros

As mentioned above, embodiments of the present invention often support navigating a UAV along a route having many waypoints, including a final waypoint and one or more intermediate waypoints. That is, methods of the kind illustrated in FIG. 12 may also include receiving user selections of a multiplicity of GUI map pixels representing waypoints, where each pixel has a location on the GUI and mapping each pixel location to Earth coordinates of a waypoint.

Such methods of navigating a UAV can also include assigning one or more UAV instructions to each waypoint and transmitting the coordinates of the waypoints and the UAV instructions in the uplink telemetry through the socket to the UAV. A UAV instruction typically includes one or more instructions for a UAV to perform a task in connection with a waypoint. Exemplary tasks include turning on or off a camera installed on the UAV, turning on or off a light installed on the UAV, orbiting a waypoint, or any other task that will occur to those of skill in the art. Such exemplary methods of navigating a UAV also include storing the coordinates of the waypoints and the UAV instructions in computer memory on the UAV, piloting the UAV to each waypoint in accordance with one or more navigation algorithms (416), and operating the UAV at each waypoint in accordance with the UAV instructions for each waypoint.

Navigation on a Course to a Waypoint

Figure 13:
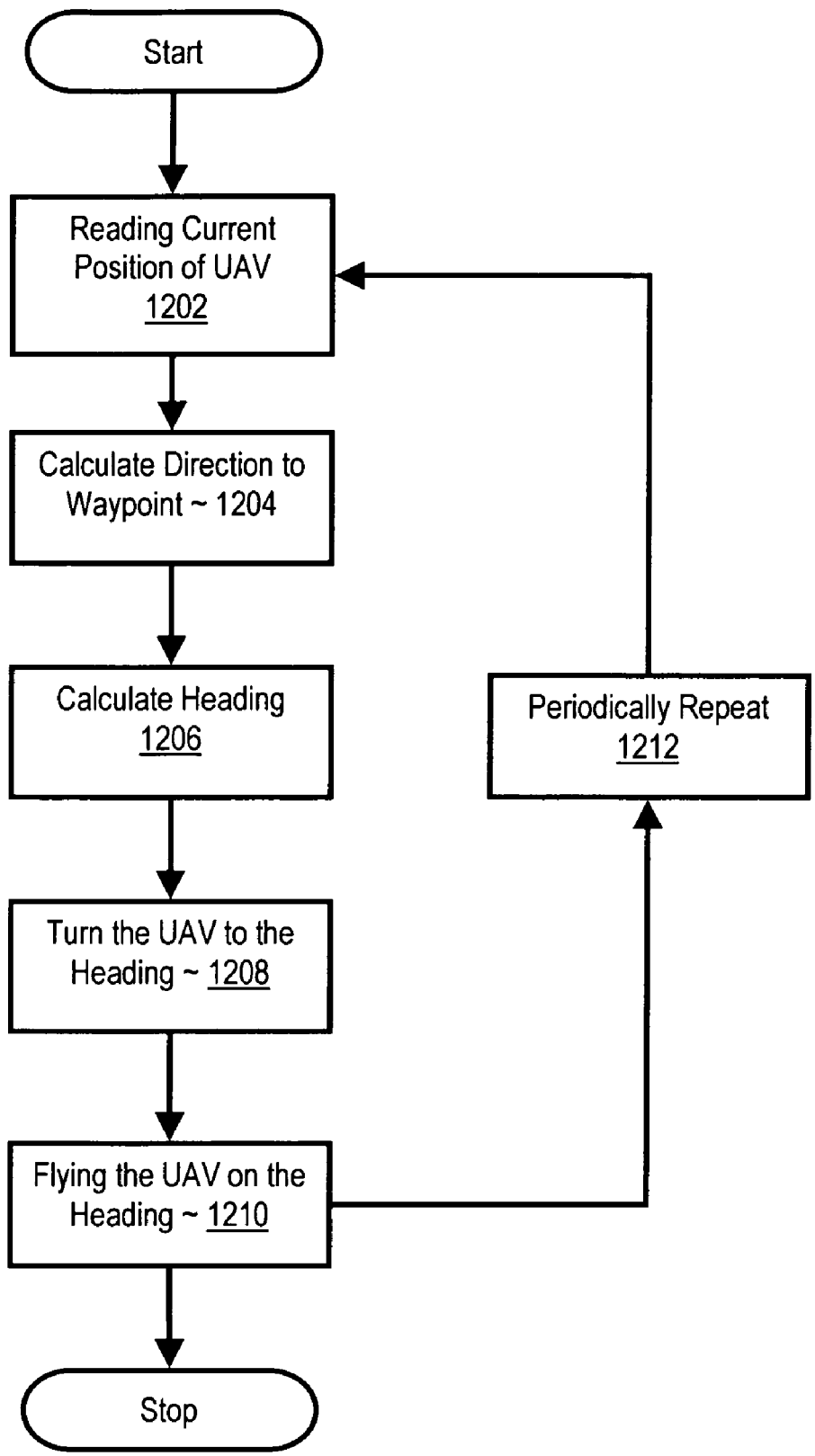
FIG. 13 sets forth a flow chart illustrating an exemplary method of piloting in accordance with a navigation algorithm.
Figure 14:
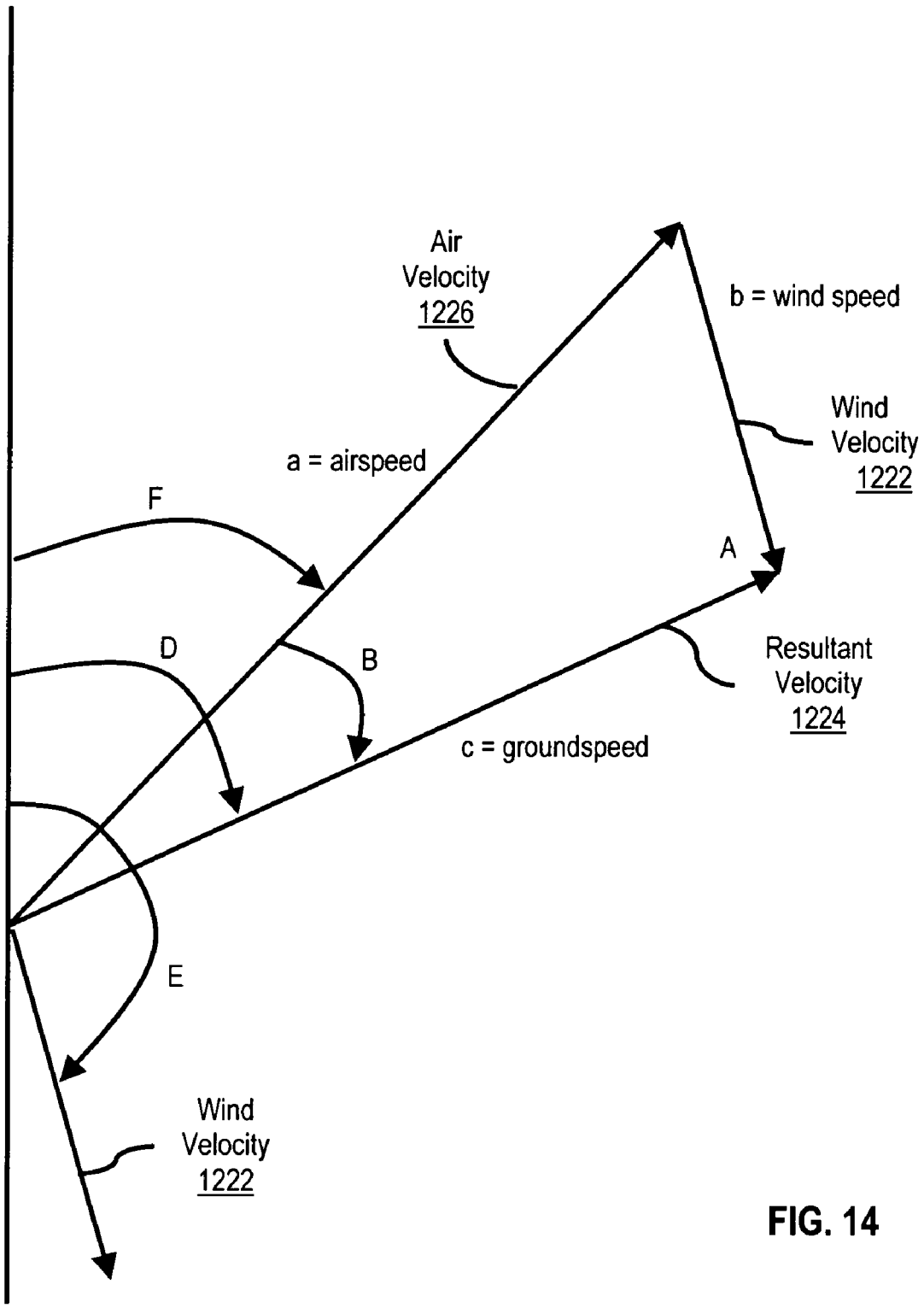
FIG. 14 sets forth a line drawing illustrating a method of calculating a heading with a cross wind to achieve a particular ground course.

A further exemplary method of navigating in accordance with a navigation algorithm is explained with reference to FIGS. 13, 14, and 15. FIG. 13 sets forth a flow chart illustrating an exemplary method of piloting in accordance with a navigation algorithm. FIG. 14 sets forth a line drawing illustrating a method of calculating a heading with a cross wind to achieve a particular ground course. And FIG. 15 sets forth a line drawing illustrating a flight path produced by application of the method of FIG. 13.

In the method of FIG. 13, piloting in accordance with a navigation algorithm comprises periodically repeating (1212) the steps of reading (1202) from the GPS receiver a current position of the UAV; calculating (1204) a direction to the waypoint from the current position; calculating (1206) a heading in dependence upon wind speed, wind direction, airspeed, and the direction to the waypoint; turning (1208) the UAV to the heading; and flying (1210) the UAV on the heading.

FIG. 14 illustrates calculating a heading in dependence upon wind speed, wind direction, airspeed, and the direction to the waypoint. FIG. 14 sets forth a line drawing illustrating relations among several pertinent vectors, a wind velocity (1222), a resultant velocity (1224), and a UAV's air velocity (1226). A velocity vector includes a speed and a direction. These vectors taken together represent wind speed, wind direction, airspeed, and the direction to the waypoint. In the example of FIG. 14, the angle B is a so-called wind correction angle, an angle which subtracted from (or added to, depending on wind direction) a direction to a waypoint yields a heading, a compass heading for a UAV to fly so that its resultant ground course is on a cross track. A UAV traveling at an airspeed of 'a' on heading (D–B) in the presence of a wind speed 'b' with wind direction E will have resultant ground speed 'c' in direction D.

In FIG. 14, angle A represents the difference between the wind direction E and the direction to the waypoint D. In FIG. 14, the wind velocity vector (1222) is presented twice, once to show the wind direction as angle E and again to illustrate angle A as the difference between angles E and D. Drawing wind velocity (1222) to form angle A with the resultant velocity (1224) also helps explain how to calculate wind correction angle B using the law of sines. Knowing two sides of a triangle and the angle opposite one of them, the angle opposite the other may be calculated, in this example, by $B=\sin^{-1}(b (\sin A)/a)$. The two known sides are airspeed 'a' and wind speed 'b.' The known angle is A, the angle opposite side 'a,' representing the difference between wind direction E and direction to the waypoint D. Calculating a heading, angle F on FIG. 14, is then carried out by subtracting the wind correction angle B from the direction to the waypoint D.

Figure 15:
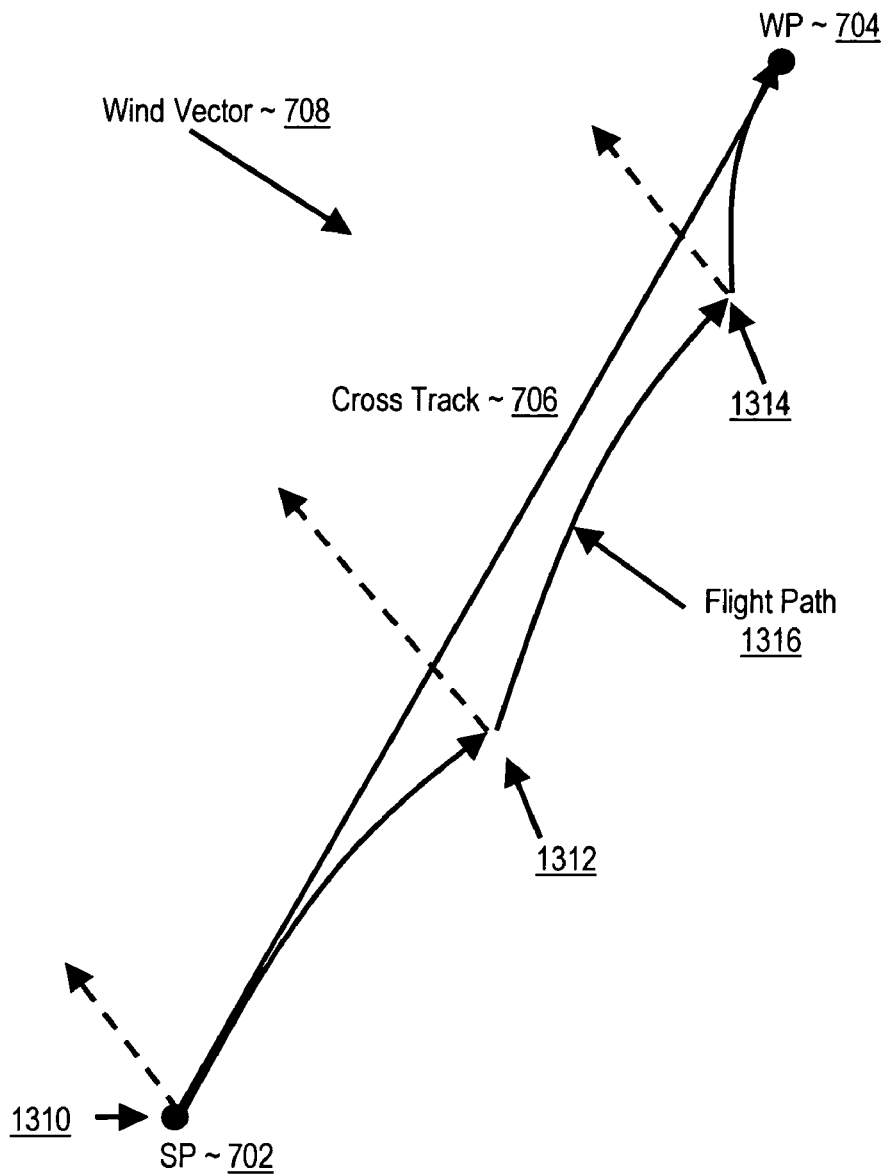
FIG. 15 sets forth a line drawing illustrating a flight path produced by application of the method of FIG. 13.

FIG. 15 shows the effect of the application of the method of FIG. 13. In the example of FIG. 15, a UAV is flying in a cross wind having cross wind vector (708). Curved flight path (1316) results from periodic calculations according to the method of FIG. 13 of a new heading straight whose resultant with a wind vector is a course straight from a current location to the waypoint. FIG. 15 shows periodic repetitions of the method of FIG. 13 at plot points (1310, 1312, 1314). For clarity of explanation, only three periodic repetitions are shown, although that is not a limitation of the invention. In fact, any number of periodic repetitions may be used as will occur to those of skill in the art.

Navigation on a Course Set to a Cross Track Direction

Figure 16:
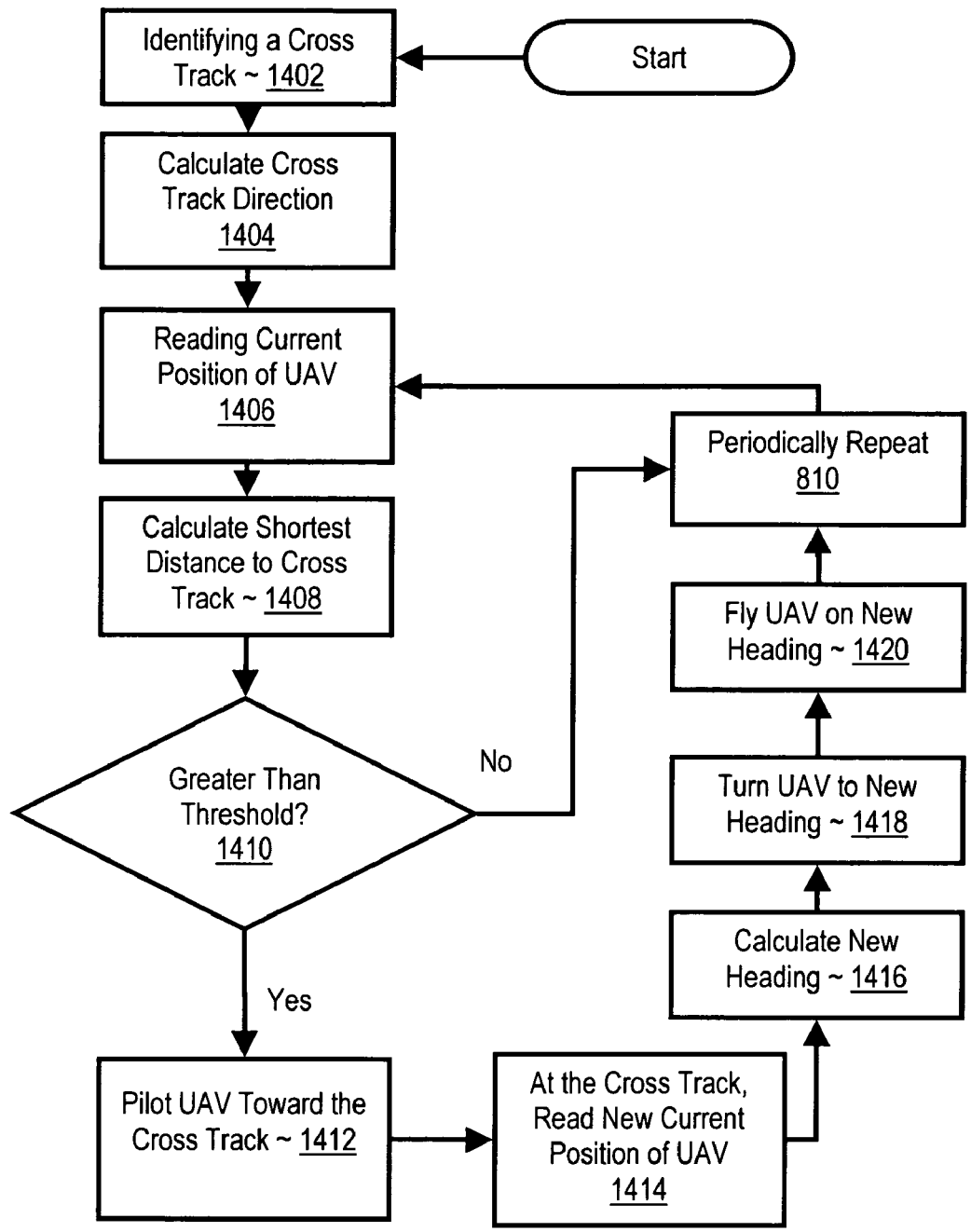
FIG. 16 sets forth a flow chart illustrating an exemplary method of piloting in accordance with a navigation algorithm.

A further exemplary method of navigating in accordance with a navigation algorithm is explained with reference to FIGS. 16 and 17. FIG. 16 sets forth a flow chart illustrating an exemplary method of piloting in accordance with a navigation algorithm, and FIG. 17 sets forth a line drawing illustrating a flight path produced by application of the method of FIG. 16.

The method of FIG. 16 includes identifying (1402) a cross track and calculating (1404) a cross track direction from the starting position to the waypoint. In the method of FIG. 16, piloting in accordance with a navigation algorithm is carried out by periodically repeating the steps of reading (1406) from the GPS receiver a current position of the UAV; calculating (1408) a shortest distance between the cross track and the current position; and, if the shortest distance between the cross track and the current position is greater than a threshold distance, piloting (1412) the UAV to the cross track. Upon arriving at the cross track, the method includes: reading (1414) from the GPS receiver a new current position of the UAV; calculating (1416), in dependence upon wind speed, wind direction, airspeed, and the cross track direction, a new heading; turning (1418) the UAV to the new heading; and flying (1420) the UAV on the new heading.

Figure 17:
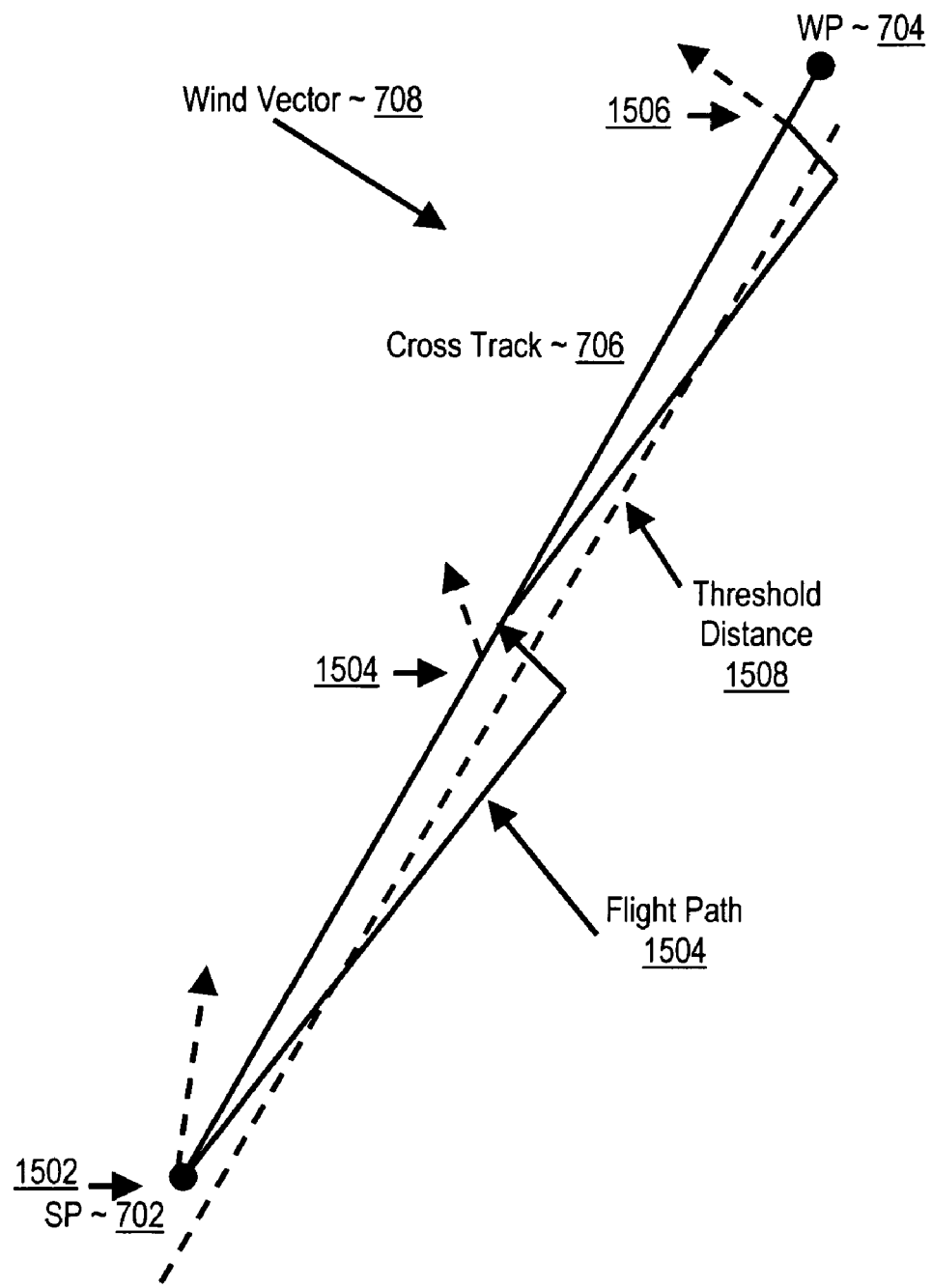
FIG. 17 sets forth a line drawing illustrating a flight path produced by application of the method of FIG. 16.

FIG. 17 shows the effect of the application of the method of FIG. 16. In the example of FIG. 17, a UAV is flying in a cross wind having cross wind vector (708). Flight path (1504) of FIG. 17 results from periodic calculations according to the method of FIG. 16 of a shortest distance between a current position and the cross track (706), flying the UAV back to the cross track, and, upon arriving at the cross track, calculating a new heading (1502, 1505, and 1506) and flying the UAV on the new heading.

Enabling Services on a UAV

UAVs according to embodiments of the present invention are capable of performing many tasks. Such tasks are often mission-specific and location specific. That is, a UAV may often be required to perform a particular mission-specific tasks at a particular mission-specific location. While the capabilities of a UAV vary according to the software running on the UAV, installing many software packages for many different mission types on the UAV may be burdensome on the limited on-board resources. It is therefore advantageous to upload to the UAV service modules that are specific to the UAV's current position.

Figure 18:
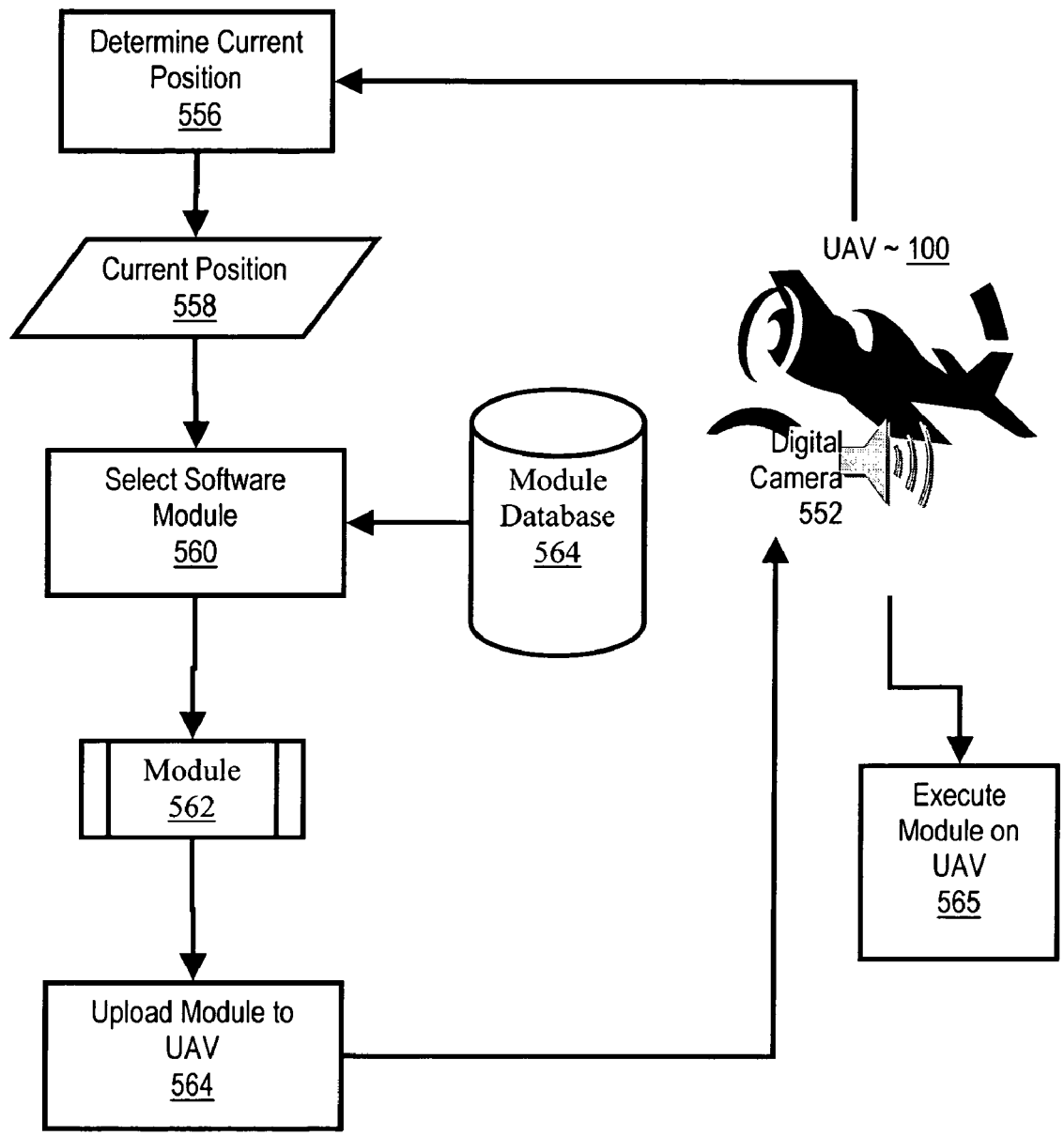
FIG. 18 sets forth a flow chart illustrating an exemplary for enabling services on a UAV.

For further explanation, FIG. 18 sets forth a flow chart illustrating an exemplary for enabling services on a UAV. The method of FIG. 18 includes determining (556) a current position (558) of the UAV (100). In the example of FIG. 18, determining (556) a current position (558) of the UAV (100) is typically carried out by receiving a GPS location of the UAV from a GPS receiver located on-board the UAV as discussed in more detail above.

The method of FIG. 18 also includes selecting (560) a service module (562) for the UAV (100) in dependence upon the current position (558) of the UAV (100). A service module is software that when executed on the UAV instructs the UAV to perform specific tasks. Service modules may be tailored to specific UAV missions. Consider the example of a service module tailored for security surveillance of a facility. Such a module pilots the UAV in a flying pattern resulting in the UAV circling an entrance of the facility. The executing software module instructs an onb-board digital camera to capture and record images of the entrance of the facility. The software module employs image recognition software to analyze the recorded images by comparing the images with a database of images consistent with unauthorized personnel entering or exiting the facility. Upon identifying an image consistent with unauthorized personnel entering or exiting, the UAV module notifies security in the facility by activating an alarm.

The service module may be OSGi compliant application programming and therefore the module may execute on an OSGi service framework installed on the UAV. As discussed above, the OSGi specification is a Java-based application layer framework that provides vendor neutral application layer APIs and functions. In OSGi, the framework is a hosting platform for running 'services'. A service is a group of Java classes and interfaces that implement a certain feature. Services in OSGi are packaged in 'bundles' with other files, images, and resources that the services need for execution. A bundle is a Java archive or 'JAR' file including one or more service implementations, an activator class, and a manifest file. An activator class is a Java class that the service framework uses to start and stop a bundle. A manifest file is a standard text file that describes the contents of the bundle.

Selecting (560) a service module (562) for the UAV (100) in dependence upon the current position (558) of the UAV (100) may be carried out by retrieving from a module database (564) a module record identifying the selected service module in dependence upon the current position (558) of the UAV (100), a particular UAV identification, and other factors that will occur to those of skill in the art. Selecting (560) a service module (562) for the UAV (100) according to the method of FIG. 18 advantageously reduces the on-board resource requirements of the UAV.

The method of FIG. 18 includes uploading (564) the service module (562) to the UAV (100) and executing (656) the service module (562) on the UAV (100). Uploading a location and mission-specific service module to the UAV and executing the module on the UAV advantageously requires fewer on-board resources for the UAV and increases the total number of tasks that a UAV may perform. The UAV may require fewer on-board computer resources because the UAV must only be capable of running the current service module at the current location. The UAV is made more flexible, because the UAV is capable of executing many service modules and therefore performing many different tasks depending upon the currently installed service module.

The UAV (100) of FIG. 18 is also capable of disabling previously installed service modules upon installation of a new service module. Disabling previously installed service modules is typically carried out by erasing the module from memory, by simply not running the module, or in other ways that will occur to those of skill in the art.

The UAV (100) of FIG. 18 is also capable of being dispatched to a particular location and upon arrival receiving the appropriate service module. Dispatching the UAV to a particular location provides a user on the ground increased control over the mission of the UAV. Dispatching the UAV to a waypoint may be carried out by receiving in a remote control device a user's selection of a GUI map pixel that represents a waypoint for UAV navigation, the pixel having a location on the GUI, mapping the pixel's location on the GUI to Earth coordinates of the waypoint, transmitting the coordinates of the waypoint to the UAV, reading a starting position from a GPS receiver on the UAV, and piloting the UAV, under control of a navigation computer, from the starting position to the waypoint in accordance with a navigation algorithm as discussed in more detail above.

As discussed above, selecting (560) a service module (562) for the UAV (100) in dependence upon the current position (558) of the UAV (100) often includes retrieving from a module database (564) a module record identifying an appropriate service module. For further explanation, FIG. 19 sets forth a relationship diagram illustrating exemplary data structures useful in selecting a service module for a UAV. The example of FIG. 19 includes a UAV record (670) that represents a UAV. The exemplary UAV record (670) includes a UAV ID (672) that uniquely identifies the UAV. The exemplary UAV record includes a current service module ID field (674) that contains an identification of the service module currently installed on the UAV. The UAV record (670) includes a location field (676) that includes an identification of the current position of the UAV, such by a longitude, a latitude, and an altitude.

Figure 19:
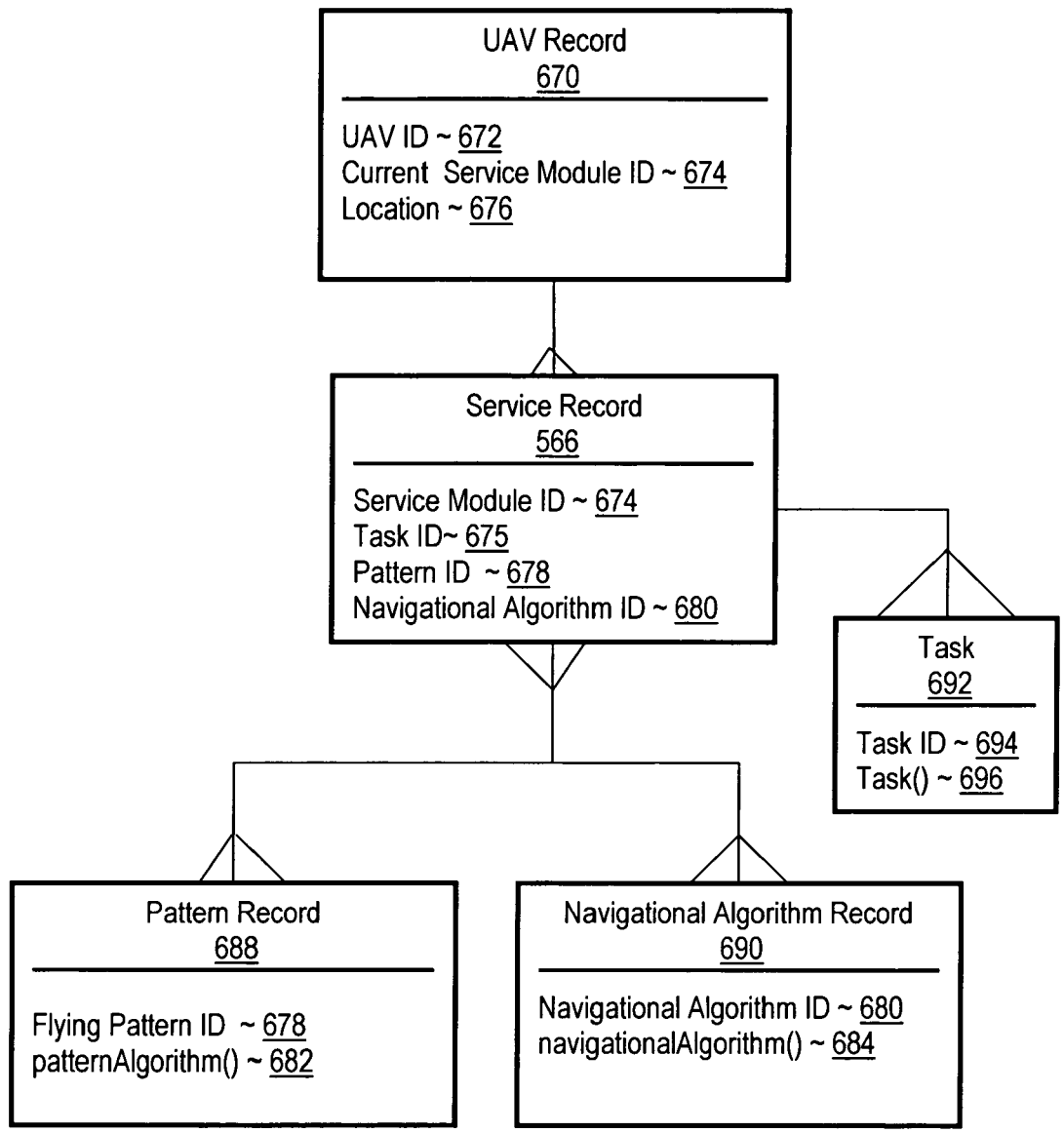
FIG. 19 sets forth a relationship diagram illustrating exemplary data structures useful in selecting a service module for a UAV.

The example of FIG. 19 includes a services record (566) that represents a service module that when executed on the UAV instructs the UAV to perform location-specific and mission-specific tasks. A UAV may perform more than one service at a time, and therefore the services record (566) of FIG. 19 is related many-to-one to the UAV record through the service module ID field (674).

Executing a service module may in fact execute a number of mission-specific tasks and therefore the services record (566) of FIG. 19 is related one-to-many to a task record (692) that represents a mission-specific task performed as a result of executing the service module. Example of tasks include software instructions to turn on an on-board digital camera, software instructions to turn on flood lights installed on the UAV, software instructions to notify personnel through a data communications link, and many others as will occur to those of skill in the art. The task record (692) of FIG. 19 includes a task ID (694) uniquely identifying the task and a member method task( ) (696) whose execution results in the UAV performing the task.

Executing a service module may result in the selection of one or more navigational algorithms and piloting the UAV according to the navigational algorithms. The services record (566) of FIG. 19 is therefore related one-to-many to the navigational algorithm record (690) that represents a navigational algorithm. The navigational algorithm record (690) of FIG. 19 contains a navigational algorithm ID (680) that uniquely identifies the navigation algorithm and a member method navigationalAlgorithm( ) (684) whose execution pilots the UAV in accordance with the navigation algorithm.

Executing a service module may result in the selection of one or more flying patterns and piloting the UAV according to the flying pattern. The services record (566) of FIG. 19 is therefore related one-to-many to the flying pattern record (688) that represents a flying pattern. Flying pattern of FIG. 19 contains a pattern ID (678) that uniquely identifies the flying pattern and a member method patternAlgorithm( ) (682) whose execution pilots the UAV in accordance with the flying pattern.

A flying pattern is a consistent pattern of flight. Flying patterns include patterns for orbiting a waypoint, flying a square or other shape around a waypoint, or other flying patterns that will occur to those of skill in the art. For further explanation, FIG. 20 sets forth a flow chart illustrating an exemplary method for flying a pattern. A flying pattern is implemented by a consistent series of flight control instructions that pilot the UAV such that the resulting flight path creates a pattern. Flying patterns are typically implemented with algorithms that result in the UAV flying in a particular shaped pattern over the ground at a particular altitude.

Figure 20:
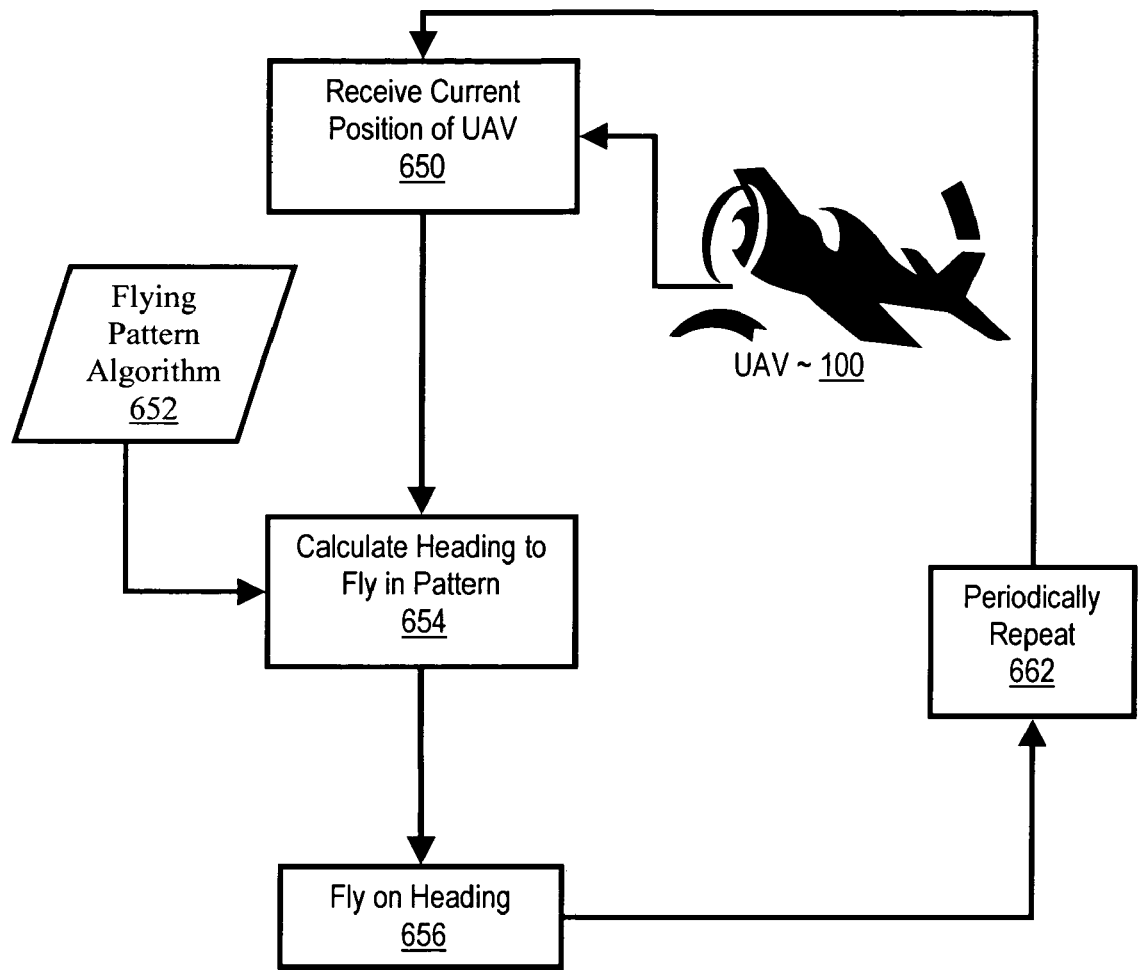
FIG. 20 sets forth a flow chart illustrating an exemplary method for flying a pattern.

The method of FIG. 20 includes repeatedly (662) receiving (650) from a GPS receiver a current position of the UAV, calculating (654) a heading in dependence upon a flying pattern algorithm (652), and flying (656) on the heading. Calculating (654) a heading in dependence upon the current flying pattern algorithm (652) may be carried out by a navigational computer on-board the UAV or by a navigational computer in a remote control device. The particular heading calculated for flying a particular pattern will vary according to the flying pattern itself. For example, an algorithm for flying an orbit around a waypoint includes calculating a locus of points in a circle according to a defined radius and establishing a turn on that circle. One way to maintain the orbit in the presence of cross wind includes establishing a threshold distance from the calculated circle and periodically adjusting the heading of the UAV when the UAV deviates more that the threshold distance from the calculated circle A square shaped flying pattern may be accomplished by defining four coordinates representing corners of the square and piloting the UAV to each of the four coordinates sequentially to fly a square.

The inclusion of a circular flying pattern and a square shaped flying pattern are for explanation and not for limitation. In fact, UAVs according to embodiments of the present invention may fly patterns of many shapes as will occur to those of skill in the art including circles, squares defined by particular coordinates, and other polygons as will occur to those of skill in the art.

Figure 21:
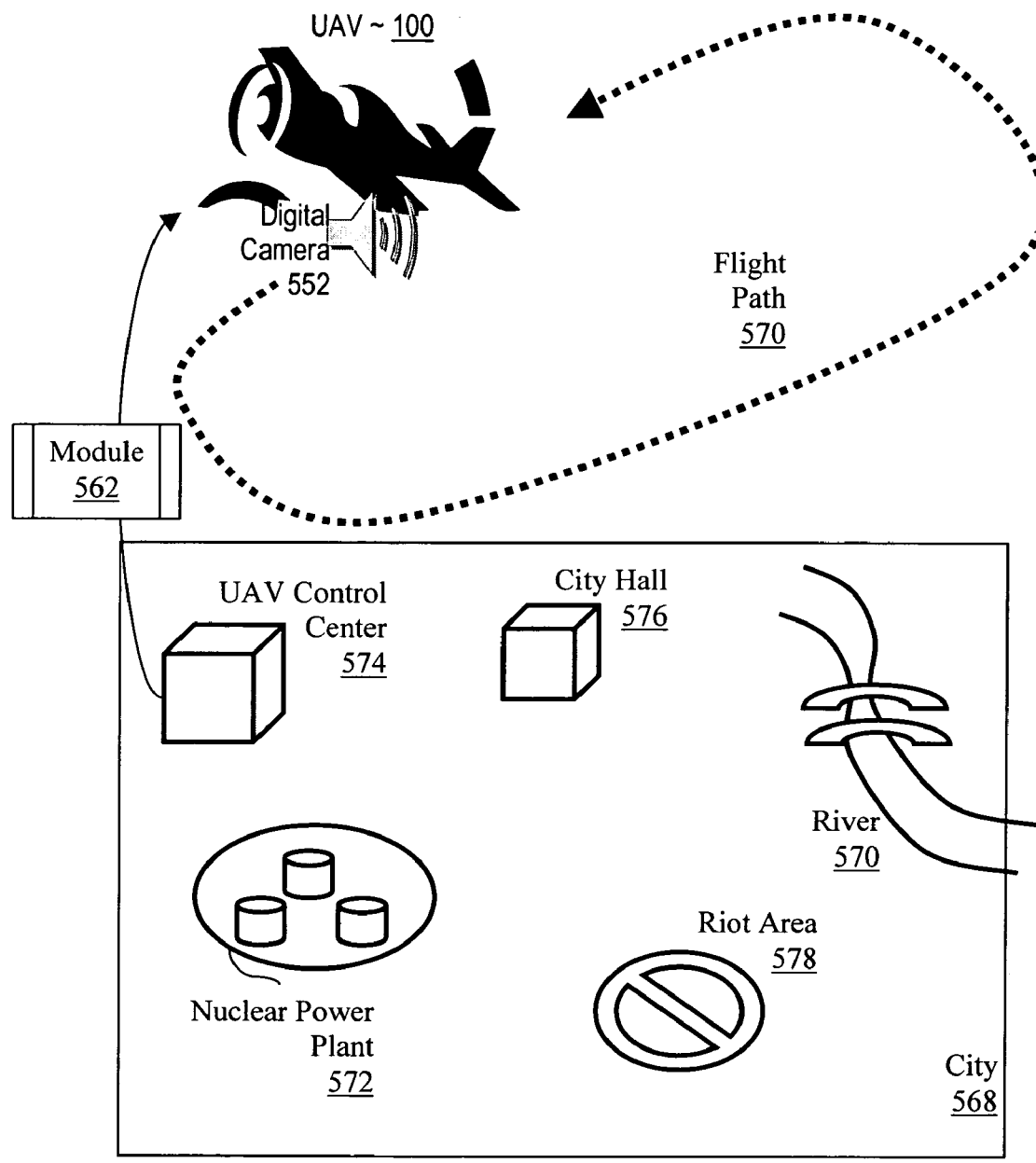
FIG. 21 sets forth a line drawing of a UAV according to the present invention flying a flight path over a city.

For further explanation, FIG. 21 sets forth a line drawing of a UAV according to the present invention flying a flight path (570) over a city (568). The exemplary city of FIG. 21 includes a nuclear power plant (572), a riot area (578), a river (570), and a city hall (576). The UAV (100) of FIG. 1 is capable of performing a variety of mission-specific tasks according to the software module currently running on the UAV. In the example of FIG. 21, the UAV's flight path (570) is designed to circumnavigate the city such that it periodically passes over the nuclear power plant (572), the river (570), and the city hall (576).

Upon passing over the nuclear power plant (572), the UAV control center (574) uploads to the UAV (100) a software module (562) designed for security of the power plant. Such a software module (562) may include software instructions for policing the nuclear power plant by activating an on-board digital camera (552) and calling into an image recognition API to identify suspicious behavior of people operating the power plant by comparing images captured with the on-board digital camera (552) with an image database including images of people engaged in previously determined suspicious behavior.

Upon passing over the river (570), the UAV control center (574) uploads to the UAV (100) a software module (562) designed for emergency rescue. Such a software module (562) may include software instructions for observing citizens enjoying the river by activating an on-board digital camera (552) and calling into an image recognition API to identify people in danger by comparing images captured with the on-board digital camera (552) with an image database including images of people drowning. The software module may also include software instructions for notifying emergency services if a person in danger is identified.

Upon passing over the city hall (576), the UAV control center (574) uploads to the UAV (100) a software module (562) designed for news coverage. Such a software module (562) may include software instructions for activating an on-board digital camera (552), recording persons entering and exiting city hall, and transmitting the images to a news center. Such a software module may advantageously reduce the need for news personnel to monitor activities at entrance of city hall (576).

The UAV (100) is also capable of being dispatched to a location. In the example of FIG. 100, the UAV may be dispatched to the riot area (578). Upon arriving at the riot area, the UAV control center (574) uploads to the UAV (100) a software module (562) designed for riot control. Such a software module (562) may include software instructions for activating an on-board digital camera (552) and transmitting images to a police station. The software module may also include software instructions activating an on-board mechanism for dropping tear gas on the riot area.

The example of FIG. 21 is for explanation and not for limitation. The example of FIG. 21 is designed to demonstrate the flexibility of UAVs according to the present invention. The specific software modules and mission types discussed are not a limitation of the present invention. In fact, enabling services on a UAV may be carried out by selecting, uploading, and executing any service module in dependence upon the current location of the UAV as will occur to those of skill in the art.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for enabling services on a UAV, the method comprising:

dispatching the UAV to a waypoint including receiving in a remote control device a user's selection of a GUI map pixel that represents a waypoint for UAV navigation, the GUI map pixel having a location on a GUI, mapping the GUI map pixel's location on the GUI to Earth coordinates of the waypoint, transmitting the Earth coordinates of the waypoint to the UAV, reading a starting position from a GPS receiver on the UAV, and piloting the UAV, under control of a navigation computer, from the starting position to the waypoint in accordance with a navigation algorithm; and wherein mapping the GUI map pixel's location on the GUI to Earth coordinates of the waypoint includes mapping GUI map pixel boundaries of the GUI map to Earth coordinates, identifying a range of latitude and a range of longitude represented by each GUI map pixel, and locating a region on the surface of the Earth in dependence upon the boundaries, the ranges, and the location of the GUI map pixel on the GUI map;

and wherein the method further comprises:
    determining a current position of the UAV;
    selecting a service module for the UAV in dependence upon the current position of the UAV including retrieving from a module database a module record in dependence upon the current position of the UAV;
    uploading the service module to the UAV;
    executing the service module on the UAV; and
    selecting a flying pattern algorithm in dependence upon the selected service module and piloting the UAV in accordance with the flying pattern algorithm.

* * * * *